(12) United States Patent
Schmidt et al.

(10) Patent No.: US 7,068,651 B2
(45) Date of Patent: Jun. 27, 2006

(54) FIBRE CHANNEL ADDRESS ADAPTOR HAVING DATA BUFFER EXTENSION AND ADDRESS MAPPING IN A FIBRE CHANNEL SWITCH

(75) Inventors: Steven G. Schmidt, Mount Holly, NJ (US); William John Hughes, III, Mount Laurel, NJ (US); Harry V. Paul, Haddonfield, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 719 days.

(21) Appl. No.: 09/872,863

(22) Filed: Jun. 1, 2001

(65) Prior Publication Data

US 2002/0034178 A1    Mar. 21, 2002

Related U.S. Application Data

(60) Provisional application No. 60/209,226, filed on Jun. 2, 2000, provisional application No. 60/209,227, filed on Jun. 2, 2000.

(51) Int. Cl.
*H04L 12/56* (2006.01)

(52) U.S. Cl. .................. 370/389; 370/413; 370/392; 398/57; 710/3

(58) Field of Classification Search ............... 370/229, 370/230, 235, 355, 386, 389, 392, 393, 395.1, 370/397–398, 412, 413, 419, 466; 398/45–57; 710/1, 4, 7, 5, 18, 20, 30, 33–38, 62, 64
See application file for complete search history.

(56) References Cited

U.S. PATENT DOCUMENTS 6,260,079 B1 *  7/2001  White ........................... 710/8
6,298,398 B1 * 10/2001  Elliott et al. .................. 710/30

FOREIGN PATENT DOCUMENTS

| EP | 0 856 969 | | 8/1998 |
| EP | 0 856 969 A1 | * | 8/1998 |
| EP | 0 917 319 | | 5/1999 |
| WO | 99 41862 | | 8/1999 |

OTHER PUBLICATIONS

Fred Halsall, "Data Communications, Computer Networks and Open Systems", 1996, Addison-Wesley, 4th Edition, pp. 576-577.*

(Continued)

*Primary Examiner*—Ajit Patel
*Assistant Examiner*—John Shew
(74) *Attorney, Agent, or Firm*—Beck & Tysver, P.L.L.C.

(57) ABSTRACT

A method and apparatus that recognizes a portion of an address that would be unrecognizable to an intended associated switch or device and manipulates the portion of the address to make it recognizable. The apparatus and method manipulates a discontinuous address to provide the appearance to the associated device, switch or peripheral, that the address is continuous. This provides additional address capacity such that a new address is created within the switch itself for routing data within the switch. All or a portion of the switches in network are preassigned a chassis address, and each chassis also has a specific switch address that is different from the preassigned chassis address. An address adaptor provides translation of addresses and mapping within a switch so that in the event of a port failure, affected frames can be redirected from the failed port by employing the described translation and mapping operations.

50 Claims, 25 Drawing Sheets

OTHER PUBLICATIONS

K. Trowell et al., "Introduction to IBM 5/390 Ficon"; IBM Co. International Technical Support Organization, USA XP002197447 retrieved fromt he Internet at 222.redbooks.ibm.com on Apr. 23, 2002.

* cited by examiner

*Fig. 1B*
*PRIOR ART*

| ROUTING CONTROL (R_CTRL) | | |
|---|---|---|
| CLASS SPECIFIC CONTROL (CS_CTL) | DESTINATION ID (D_ID) | |
| DATA STRUCTURE TYPE (TYPE) | SOURCE ID (S_ID) | |
| | FRAME CONTROL (F_CTL) | |
| SEQUENCE ID (SEQ_ID) | DATA FIELD CONTROL (DF_CTL) | SEQUENCE COUNT (SEQ_CNT) |
| ORIGINATOR ID (OX_ID) | | RESPONDER ID (RX_ID) |
| PARAMETER OR RELATIVE OFFSET | | |

~14

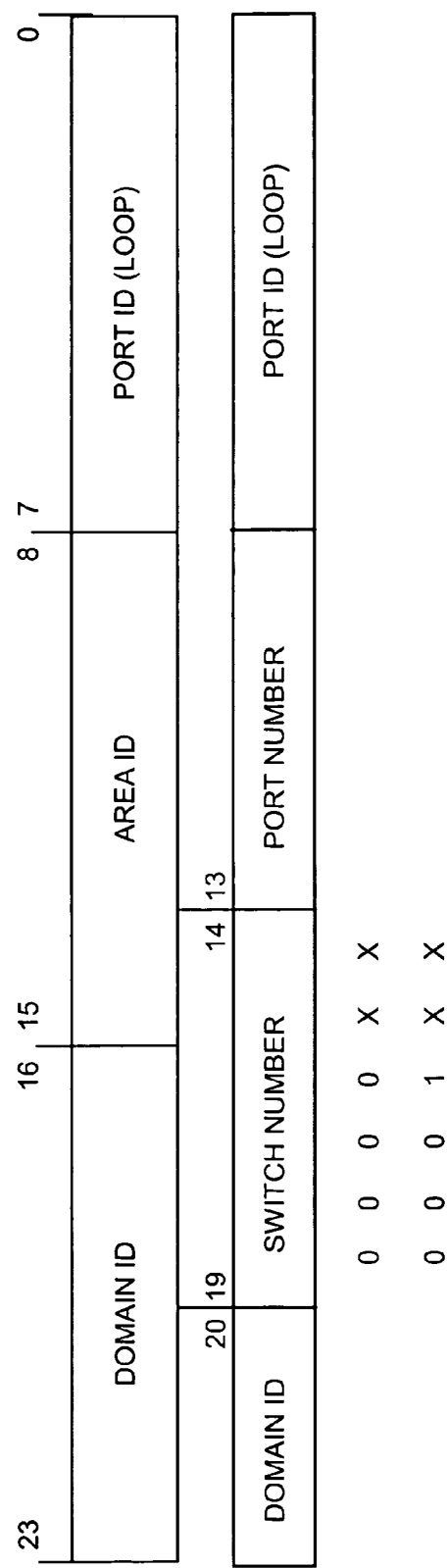

FIBRE CHANNEL ADDRESS ADAPTOR HAVING DATA BUFFER EXTENSION AND ADDRESS MAPPING IN A FIBRE CHANNEL SWITCH

RELATED APPLICATIONS

This application claims the benefit of U.S. Provisional Application No. 60/209,226, filed Jun. 2, 2000, and U.S. Provisional Application No. 60/209,227, filed Jun. 2, 2000, the entire teachings of which are incorporated herein by reference.

BACKGROUND

Mainframes, super computers, mass storage systems, workstations and very high resolution display subsystems are frequently connected together to facilitate file and print sharing. Common networks and channels used for these types of connections oftentimes introduce communications bottle necks, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and provide the error management required to recover from the error conditions.

One type of communications interconnect that has been developed is fibre channel. See Fibre Channel Physical and Signaling Interface, Revision 4.3, (ANSI) (1994). Briefly, fibre channel is a switched protocol that allows concurrent communication among workstations, super computers and various peripherals. The total network bandwidth provided by fibre channel is on the order of a terabit per second. Fibre channel is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fibre and copper cable.

FIG. 1A illustrates a variable-length frame 11 as described by the fibre channel standard. The variable-length frame 11 includes a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 includes either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 is more flexible than a fixed frame and provides for higher performance by accommodating the specific needs of specific applications.

FIG. 1B illustrates the format of the header 14. The fields of the header include destination address (D_ID) and source address (S_ID). Other fields are included for routing control, class specific control, data structure type, sequence ID, data field control, sequence count, originator ID, responder ID and parameter/relative offset.

Fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or fibre channel switch to connect devices. The fabric includes a plurality of fabric-ports (F_ports) that provide for interconnection and frame transfer between a plurality of node-ports (N_ports) attached to associated devices that may include workstations, super computers and/or peripherals. The fabric has the capability of routing frames based upon information contained within the frames. The N_port manages the simple point-to-point connection between itself and the fabric. The type of N_port and associated device dictates the rate that the N_port transmits and receives data to and from the fabric. Transmission is isolated from the control protocol so that different topologies (e.g., point-to-point links, rings, multidrop buses, cross point switches) can be implemented.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110. The fabric 110 is an entity that interconnects various N_ports 140 and their associated workstations, mainframes and peripherals attached to the fabric 110 through F_ports 142. The fabric 110 receives frames of data from a source N_port and routes the frames to a destination N_port.

The fibre channel standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another.

A fibre channel address is generally made up of three parts: a domain or atomic ID, an area ID and a loop ID. Fiber Connection (FICON), introduced by IBM, is based on the fibre channel standard and is optimized for enterprise applications. When FICON addressing is employed, the loop address and the domain address are fixed, but the area address is open and generally constitutes an 8 bit field. When this 8 bit field maps into an address, there may be a limited number of addresses that are assigned, e.g., 32 addresses. In large switches, this might represent only ½ the capacity needed, if, for example, the switch needs 64 addresses. This represents a problem, particularly with the advent of increased usage of Fibre channel and FICON addressing.

Moreover, with the increased use of switches in general, often a facility includes systems having multiple chassis and ports. With increased volume, the chance of failure of a single port increases. Often, the only solution available when a port fails or is defective is to replace the port in total. It would be advantageous if a solution could be found whereby ports can be spared by merely reassigning or redirecting one or more addresses.

SUMMARY

In accordance with these and other objectives, the present invention is directed to a method and apparatus for recognizing a portion of an address that would be unrecognizable to an intended associated switch or device and manipulating the portion of the address to make it recognizable. The instant apparatus and or method manipulates a discontinuous address to provide the appearance to the associated device, switch or peripheral, that the address is continuous. This approach provides additional address capacity such that a new address is created within the switch itself for routing data within the switch.

According to another aspect of the present approach which provides expanded address mapping, all or a portion of the switches in a network are preassigned a chassis address, and each chassis also has a specific switch address that is different from the preassigned chassis address.

The present approach further provides an address adaptor that provides translation of addresses, and mapping within a switch so that in the event of a port failure, affected frames can be redirected from the failed port by employing the described translation and mapping operations.

According to an aspect of the present approach, a connection between a source endpoint and a destination endpoint can be provided through a network of data switches. Inbound frames are received at the ingress port of a first data switch in the network from a source endpoint, each frame having a header that includes first destination address information. The first destination address information of each received frame is mapped to internal destination address information at the ingress port to provide internal frames. The internal frames are switched through the network of data switches to an egress port of a second data switch using to the internal destination address information. At the egress port, the internal destination address information of each internal frame is mapped to the first destination address information for transmission to the destination endpoint.

According to an embodiment of the present approach, a connection between a source endpoint and a destination endpoint is provided through a fibre channel switch. FICON frames are received at the ingress port of a fibre channel switch from a source endpoint, each frame having a header that includes FICON address information. The FICON address information of each received FICON frame is mapped to internal address information at the ingress port to provide internal frames. The internal frames are switched through the fibre channel switch to an egress port according to the internal address information. At the egress port, the internal address information of each internal frame is mapped to the FICON address information for transmission to the destination endpoint.

While the address mapping and address adaptor features of the present approach are described in the context of particular embodiments that operate in the fibre channel environment, the principles herein can be used in other switch environments, including later developed technology without undue experimentation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1B illustrates a header of the fibre channel frame of FIG. 1A.

FIG. 23 illustrates a single frame broken into domain ID, area ID and port ID.

DETAILED DESCRIPTION

For ease of understanding, the discussion is based on the use of a fibre channel switch, but those of skill in the art will appreciate that the instant method and apparatus can be adapted to other environments.

Figure 1A:
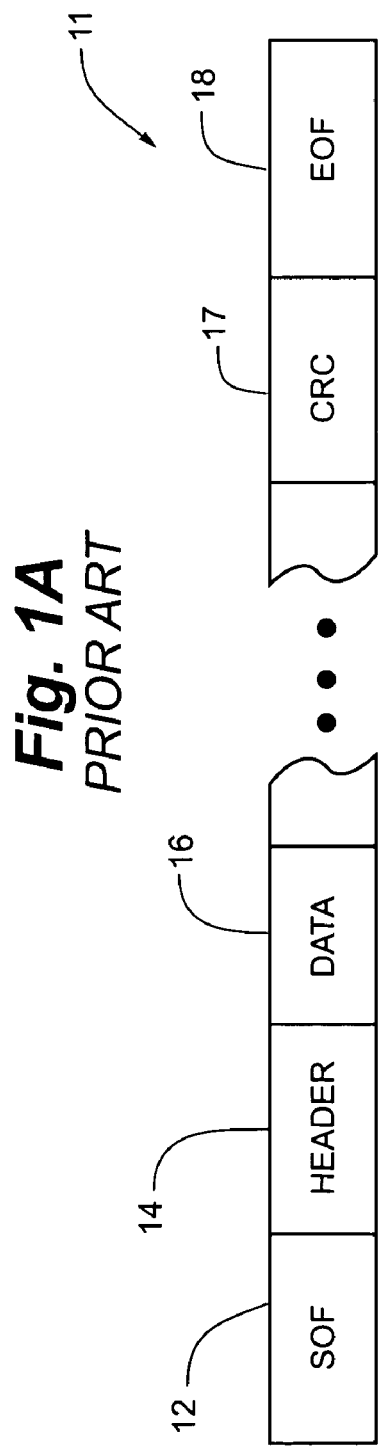
FIG. 1A illustrates a variable-length frame as described by the fibre channel standard.
Figure 2:
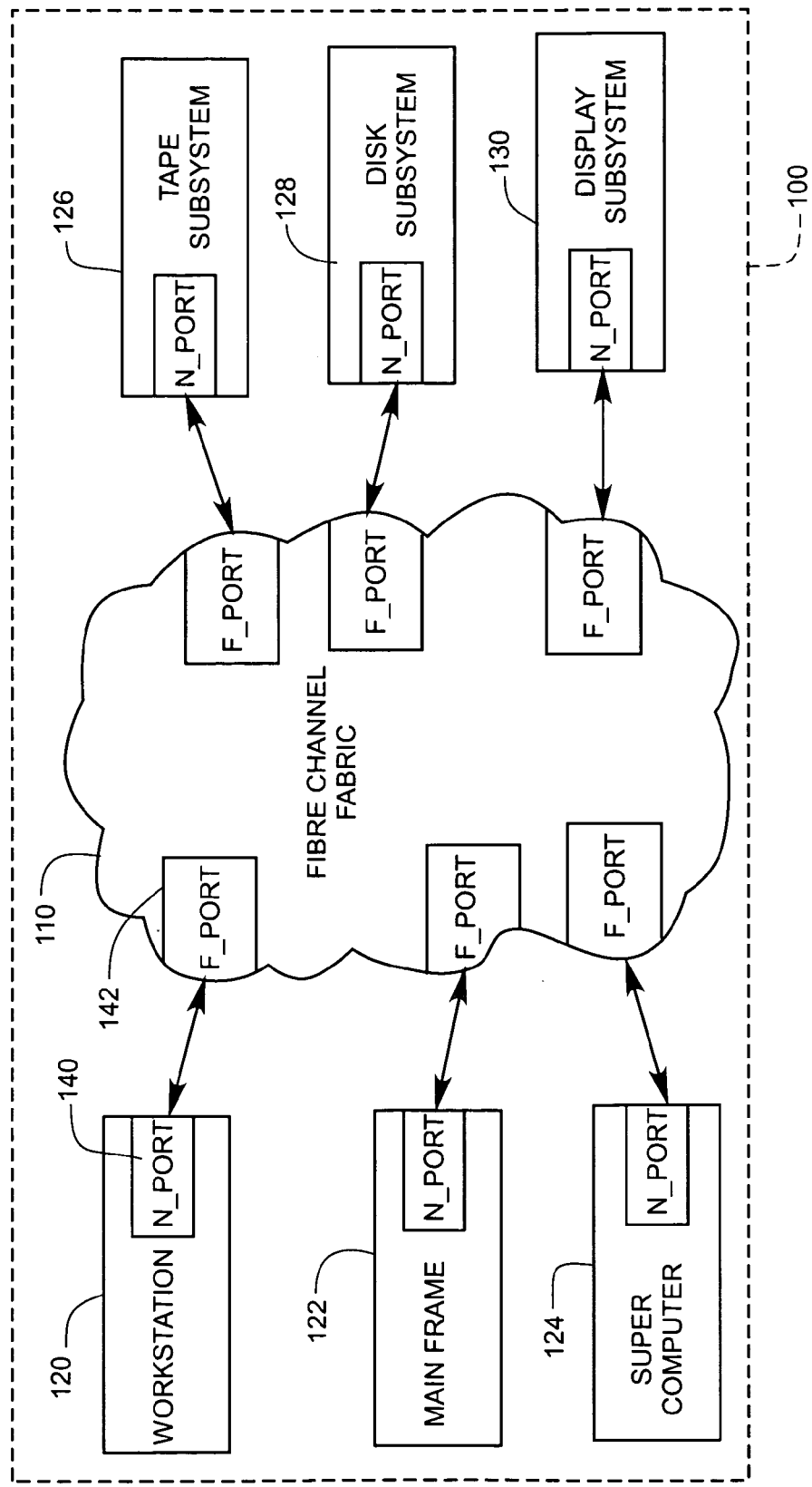
FIG. 2 illustrates a block diagram of a representative fibre channel architecture in a fibre channel network.
Figure 3:
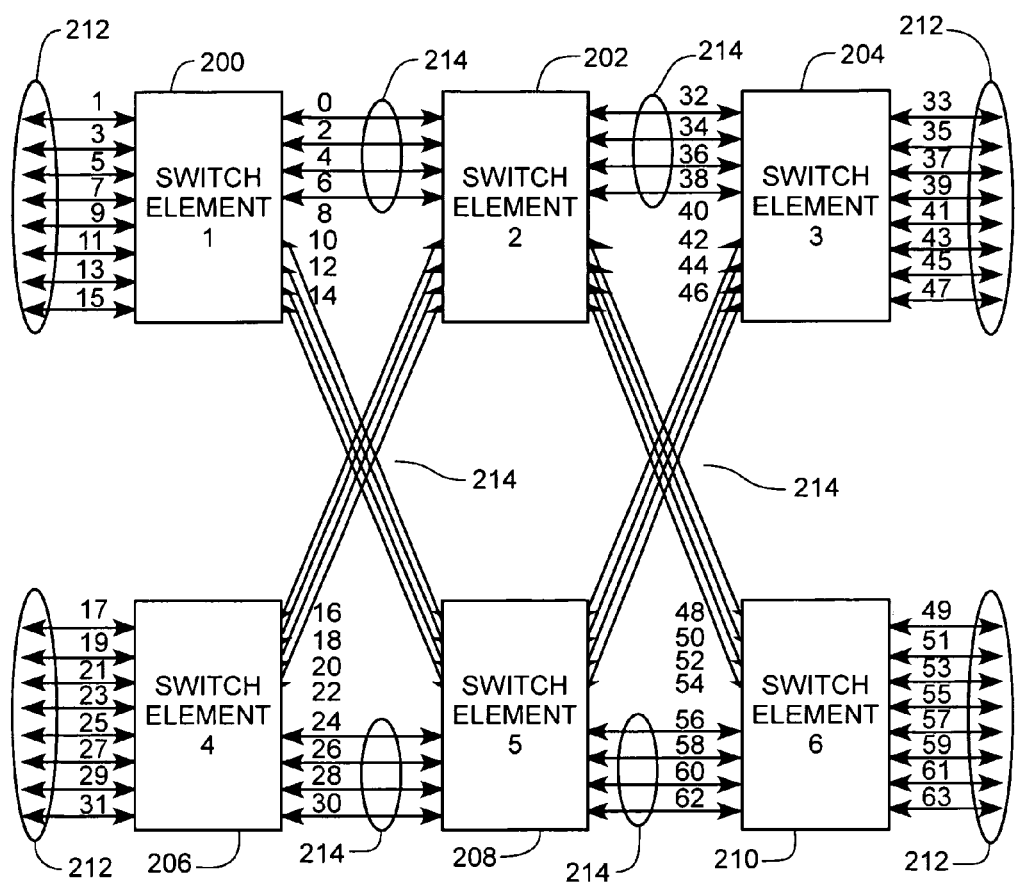
FIG. 3 illustrates a three stage switch.

FIG. 3 shows a typical multistage switch. It is made up of 6 switch elements, 200, 202, 204, 206, 208, 210, each having 16 ports, for a total of 96 ports. 64 ports labeled 214 are used as "back links" for communication between the elements. 32 ports labeled 212 are left for connection to peripheral devices such as CPUs, disks, tape drives and printers. In a typical transaction, a CPU will send data to a peripheral via the switch. Accompanying the data will be some information about the data along with a "source" and "destination" address. The switch uses the source and destination address information to route the data through the switch. The receiving peripheral needs to know the source address so it can acknowledge receipt of the data or return data to the CPU if the CPU was soliciting data from a data storage peripheral.

In this multistage switch the physical address for each port is made up of two components. The lower 4 bits of the address are the port address within the switch element and the upper 3 bits are the switch element address. As seen in the figure, all ports externally available are odd numbered. In a larger system where port addressing is defined by an address field of 8 bits (256 ports), only 128 ports on this switch are available, since all even numbered ports are occupied as back links. Each switch element's ports could have been numbered 0 through 7 on one side and 8 through 15 on the other side but this still would not produce contiguous port addresses within the port address range. It could be argued that one switch element make its odd ports available externally and that the next element make its even ports available externally. This requires that switch elements be manufactured differently if they were to be fixed in a rack or mounted in a backplane and does not provide contiguous addressing for ports physically next to each other.

One way to allow for contiguous addressing is to map a logical destination address to a physical destination address when it is received and reverse the mapping when it exits the switch. In the case of a system with 256 ports, a physical address range of 512 ports is necessary. One way to accomplish this is to intercept and shift the inbound logical address left (multiply by 2) and set the least significant bit of the address to a 1 for odd addressing (0 for even addressing). On the outbound side of the switch, the physical address is restored to the logical address by shifting it right (divide by 2) and sent to the receiving peripheral.

An embodiment of the present approach provides mapping to create a new address used exclusively inside a switch. By mapping, a discontinuous address is modified to be recognized and routed by the switch. Thus, by using circuitry according to the present approach, it is possible, for example, to provide 512 continuous hardware routable addresses using 8–16 fibre channel addresses.

While an embodiment described herein uses address shifting, it should be understood that other embodiments can use a content addressable memory or look-up table to provide the address mapping feature.

As described generally herein with respect to particular embodiments, address mapping includes redistributing or shifting certain bits of the FICON destination address (FICON D_ID) of an inbound frame to an internal format that the switch elements and switch fabric can route automatically. Likewise, when an outbound frame exits the switch, the address mapping is reversed and under normal circumstances, the original frame content fully restored. This mapping process causes exception processing to handle well-known addresses as well as frames with an invalid Domain Address.

It should be understood that, while the embodiments described herein relate to the fibre channel environment, other switches can be used with the principles of the present approach by making insubstantial changes to the address adaptor and address mapping features described herein.

In high-speed serial data systems, switches must convert data from serial to parallel, check the data for transmission errors and then pass the data to the appropriate destination where it can be serialized and retransmitted. By adding an address aliasing or mapping mechanism into the data path on both the inbound and outbound sides of the switch, the amount of time data takes to get through the switch, referred to as latency, becomes greater. While this additional latency can be kept to a minimum it can not be eliminated. However, additional data buffering can be provided to increase overall performance of a switch.

In any data communication system, flow control is necessary between transmitter and receiver when the receiver cannot guarantee that it will process the data at the rate the transmitter sends it. Generally, a transmitter will send data only when the receiver is "ready" for the data. The receiver is ready for the data if it has buffer memory available. When the receiver buffer is full (or almost full), the receiver will signal the transmitter that it is no longer "ready" and the transmitter will stop sending.

Another method of flow control, as used in fibre channel is a "credit system". At login time, a receiver will notify the transmitter as to how many credits are available to it. One credit corresponds to 2112 bytes of data, which is the fibre channel frame size. A transmitter will send data until its credit limit is exhausted. As the receiver processes the sent data, it will send "receiver readies" (R_RDYs) back to the transmitter, which replenishes the transmitters credit. To use a link efficiently, the buffer size must reflect the amount of data that can be contained on the link. The amount of time taken for a ready signal to propagate from the receiver back to the transmitter could be wasted if the buffer size is inadequate. For example, if a transmitter exhausts its credit after 1 second, and it takes 2 seconds for the ready signal to propagate back to the transmitter from the receiver due to the length of the link, then the efficiency of the link could, at best, be 50%.

The present approach provides a mechanism and apparatus which provides maximum use of an 8 bit address range (e.g., FICON addressing) through address shifting. The present approach further provides a mechanism, device and associated method whereby it is possible to extend buffer space for efficient use of a 100 Km fibre channel link.

Figure 4:
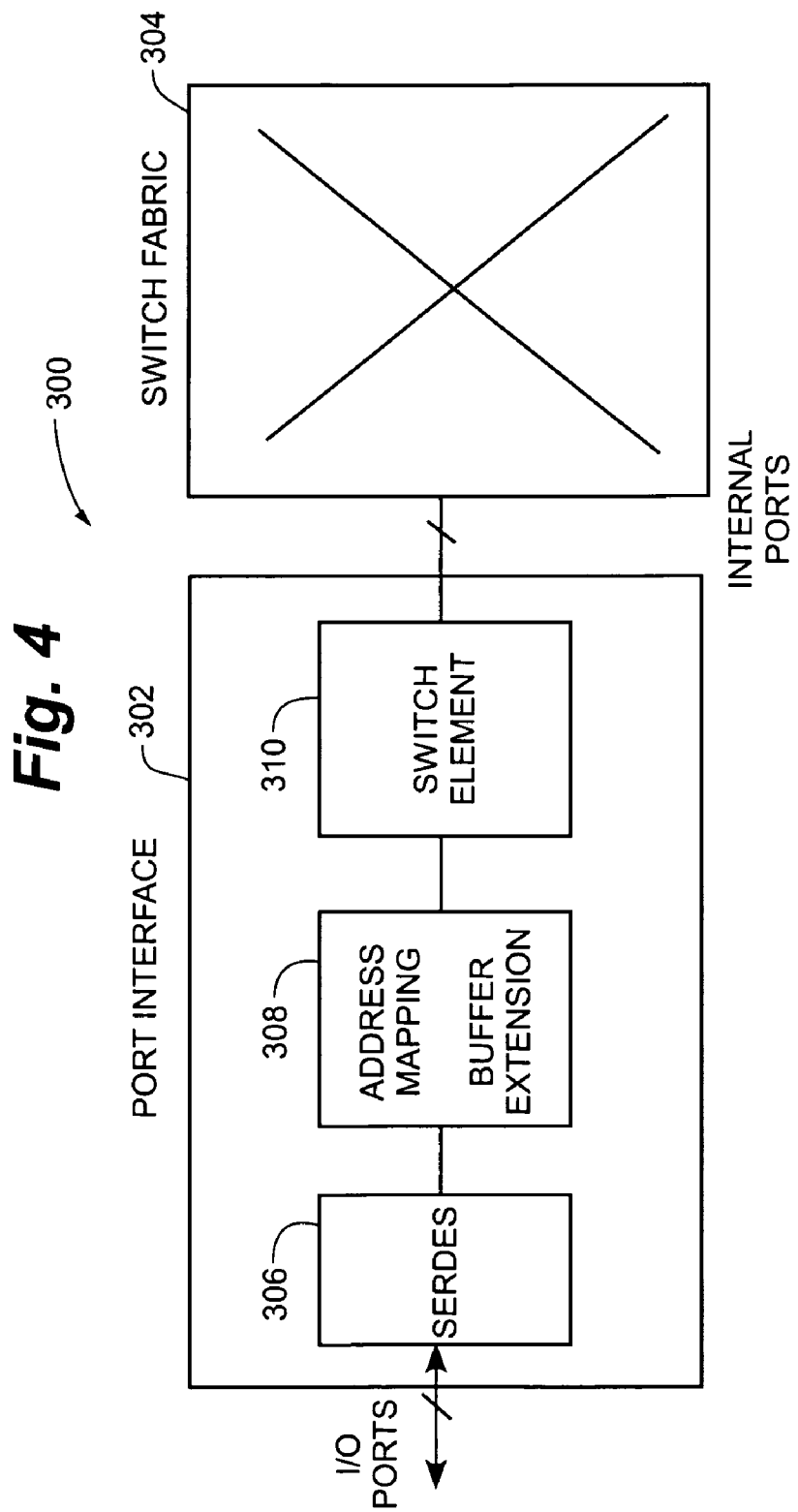
FIG. 4 is a block diagram of a first embodiment of an address adaptor in a switch according to the present system.

A first embodiment of an address adaptor that includes address mapping and data buffer extension circuitry is now described. Referring to FIG. 4, a block diagram of a fibre channel switch 300 is shown. The switch 300 includes one or more port interface blocks 302 which connect to N_port devices. The port interface block 302 includes a SERDES 306, an address adaptor having address mapping and data buffer extension circuitry 308 and a switch element 310 that provides connections to switch fabric 304. The switch element 310 can be, for example, a model S4 ASIC switch device from Ancor Communications. The switch 300 can be, for example, a model FC/9000 switch from INRANGE Technologies.

Figure 5A:
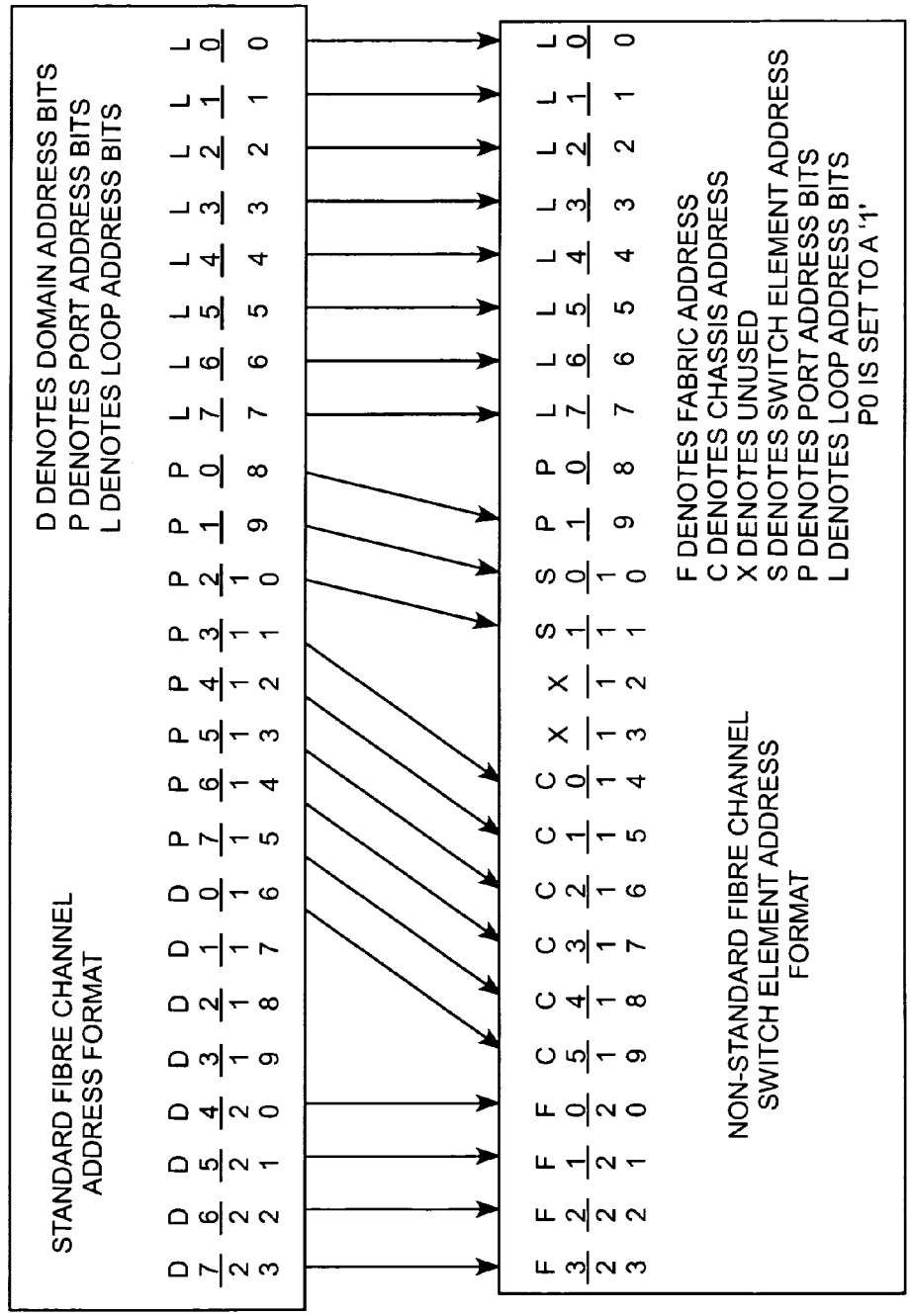
FIG. 5A illustrates mapping conversion of a destination address from standard fibre channel format to an internal, non-standard switch element format.
Figure 5B:
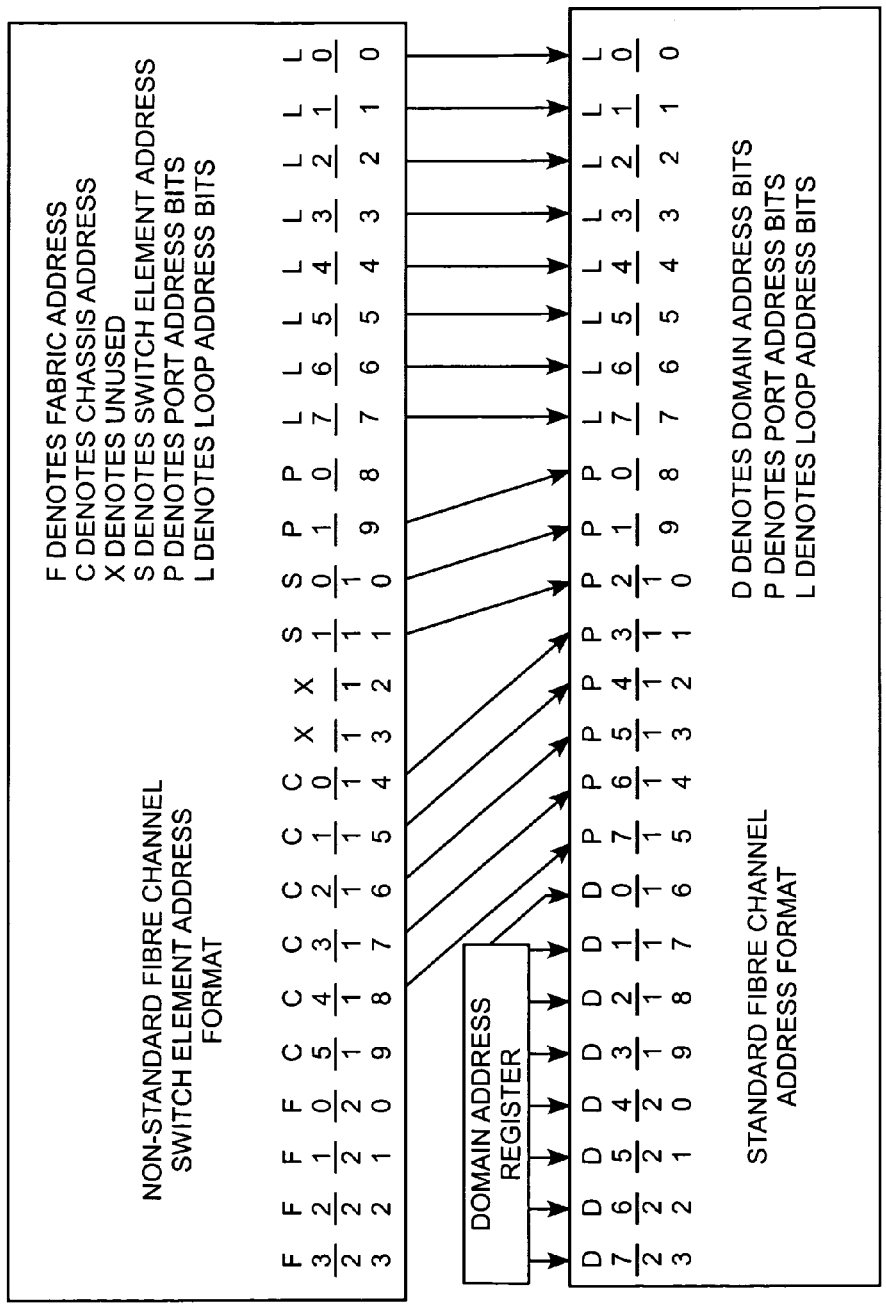
FIG. 5B illustrates mapping conversion of a destination address from an internal, non-standard switch element format to a standard fibre channel format.

Referring now to FIGS. 5A and 5B, the address mapping conversions between standard fibre channel or FICON format and non-standard, internal switch element format for a destination address (D_ID) field are illustrated. FIG. 5A shows the conversion to non-standard format from the fibre channel or FICON format. FIG. 5B shows the reverse conversion, i.e., from non-standard, internal switch element format to fibre channel or FICON format. In each case, a 24 bit address representing a destination address is converted or mapped. Herein the destination address having the standard fibre channel or FICON address format is referred to as the FICON D_ID, while the destination address having the non-standard, internal switch element format is referred to as the internal D_ID.

The address mapping with respect to FIG. 5A is now described. One skilled in the art will understand the reverse address mapping shown in FIG. 5B from the following description.

The standard fibre channel address format for the FICON D_ID is shown at the top of FIG. 5A and includes three 8 bit address fields in the 24 bit address: domain (D), port (P) and loop (L). The non-standard, internal switch element format for the internal D_ID is shown at the bottom of FIG. 5A and includes 4 bit fabric (F) field, 6 bit chassis (C) field, 2 bit switch (S) field, 2 bit port (P) field, 8 bit loop (L) field. Mapping typically occurs for all Domain Addresses except Domain IDs of F0h–FFh.

a) Frames with Domain Address bits 16–19 that mismatches an internal Domain Match Register have bit 20 of the mapped internal D_ID set to one.

b) Frames with Domain Address bits 16–19 that match the Domain Match Register have bit 20 of the mapped internal D_ID set to zero.

c) Bit 20 of the mapped internal D_ID is set for CRC errors and Code violations. The steering tables of the switch element are programmed so that any frame arriving with this bit set to one is recognized as an invalid address and sent to the configuration processor for processing.

d) Bit eight of the mapped internal D_ID is set to one. All system user ports have this bit set in their port identifier (PID).

e) Bits 8–10 of the FICON D_ID are mapped to bits 9–11 of the internal D_ID.

f) Bits 12,13 of the mapped internal D_ID are set to zero. These are referred to as the quadrant bits of the PID.

g) Bits 11–16 of the FICON D_ID are mapped to bits 14–19 of the internal D_ID.

h) Bits 0–7 and 20–23 of the FICON D_ID are mapped to bits 0–7 and 20–23 of the internal D_ID.

Figure 6:
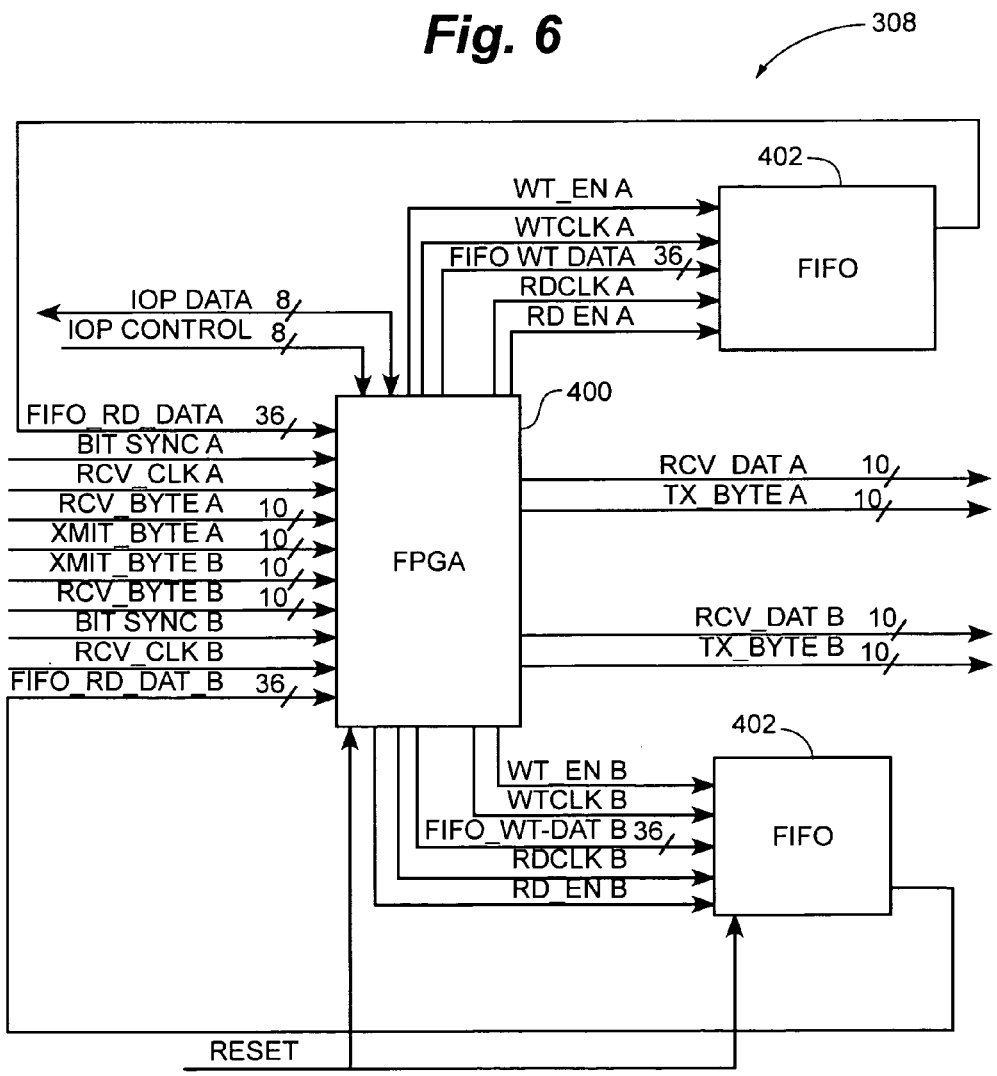
FIG. 6 illustrates address mapping and data buffer extension circuitry according to the present system.

The address adaptor having the address mapping and data buffer extension circuitry 308 is shown in FIG. 6 and includes FPGA 400 and two synchronous FIFO buffers 402. For simplicity of description, the embodiment of the FPGA is shown handling two ports, though other configurations are possible in other embodiments. In an embodiment, the FIFOs can hold up to 128K bytes, which is roughly equal to 64 credits. It should be understood that other FIFO sizes can be used with the extended buffer approach described herein.

The FPGA provides FIFO controller and frame processor features. The frame processor modifies the FICON D_IDs of the incoming FICON frames to internal D_IDs for routing through the switch. It also checks and recalculates the cyclic redundancy check (CRC) for the inbound frame. On the outbound side, the mapped internal D_IDs are converted back to their original FICON values. CRC is regenerated to reflect the changed D_ID.

The address mapping and data buffer extension circuitry can be bypassed by enabling a bypass multiplexer as described further herein. This is typically necessary if the port is to participate in a public loop. For example, a fibre channel FC_AL connection requires that latency through an L_port be no longer than 6 transmission words or 24 byte times. For example, it may take 22 of the 24-byte times to propagate a word through a switch element. The multiplexer adds less than a nanosecond delay to the inbound or outbound data path. If the loop configuration is small enough, and the distances between loop devices is short enough, violation of the 24 byte time limit has no effect. A bypass circuit can also be implemented within the FPGA to limit the loop configuration if enabled.

The address mapping and data buffer extension circuitry is bypassed at RESET. Fibre channel primitive sequences can only be sent between frames and do not adhere to the frame format. The Not Operational Status (NOS) and Off Line Status (OLS) primitives are only used in "point to point" topologies. If NOS or OLS primitives are detected, the port is not on a loop and the bypass is disabled. At login time, address modifiers are preferably enabled if the N_port is recognized as a FICON port. However, it should be understood that other embodiments of the address mapping and data buffer extension circuitry can also work with known ports or peripherals other than FICON.

Figure 7:
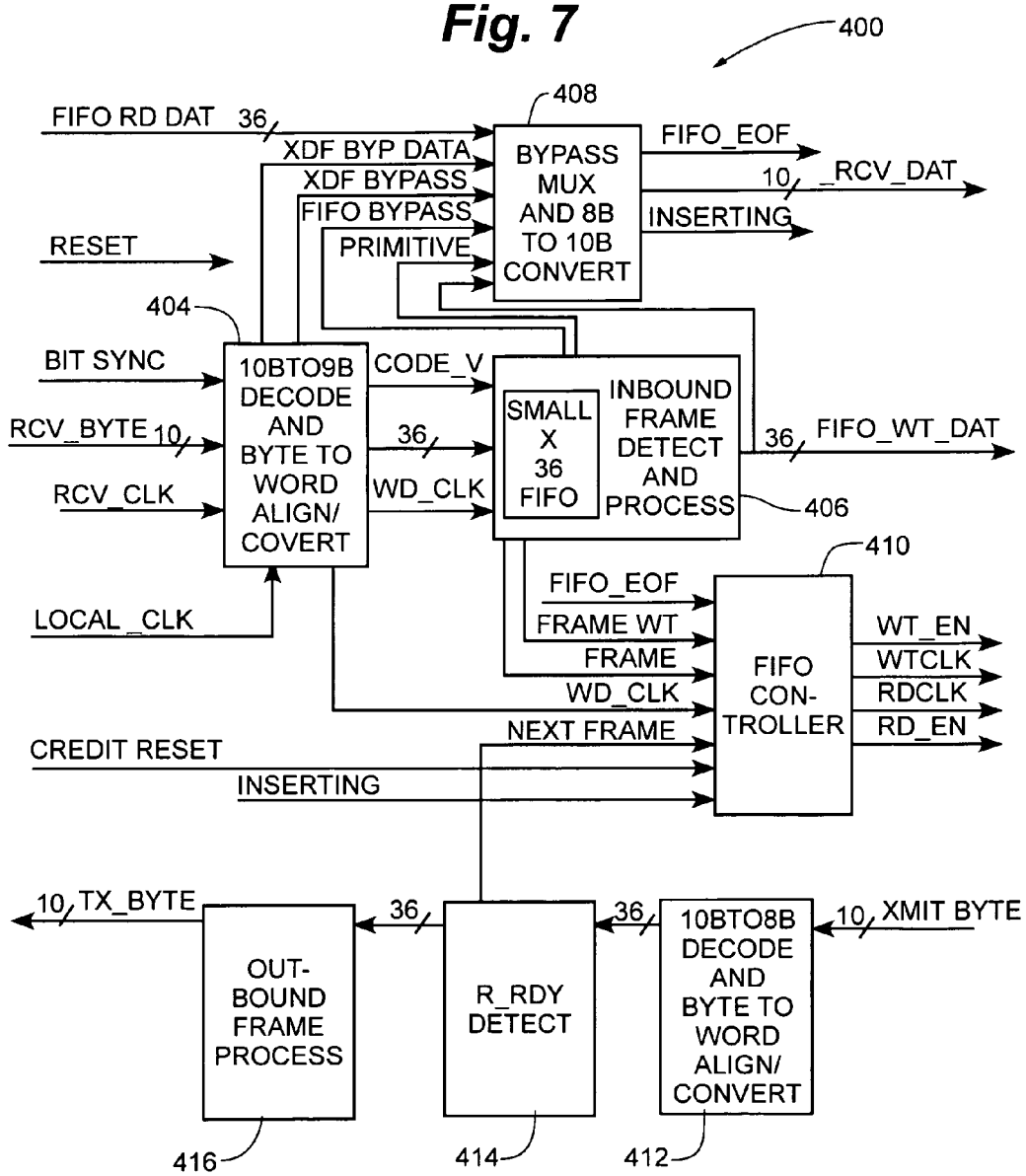
FIG. 7 illustrates a block diagram of the field programmable gate array in the circuitry of FIG. 6 according to the present system.

An embodiment of the FPGA 400 is shown in FIG. 7. For simplicity of description only, half of the circuit is shown. The FPGA includes 10b/9b decoder 404, inbound frame processor (IFP) 406, bypass multiplexer 408 and FIFO controller 410. The FPGA also includes 10b/8b decoder 412, ready detector 414, and outbound frame processor (OFP) 416. Received data from a connected N_port device passes through SERDES 306 (FIG. 4) and enters the FPGA on the 10 bit RCV_BYTE bus. If the bit sync signal is active (indicating that the SERDES is operating and in sync), the 10b code is decoded by decoder 404 into a 9-bit code that reflects its 8b value and whether or not it is a control character. The 9 bit values are stacked to form a 36-bit word, which can be processed at ¼ the Fibre Channel speed. The Inbound Frame Processor (IFP) 406 monitors the 36-bit word for Start of Frame (SOF) and other primitive sequences.

The IFP 406 passes the incoming frames to the external credit FIFO 402 (FIG. 6). The IFP 406 includes a small FIFO 406A used for data smoothing. The FIFO controller 410 provides the read/write enables and the read/write clocks to the credit FIFO. FIFO writes are triggered by enables from the IFP 406 and FIFO reads are triggered by the R_RDY detection logic 414.

The 36-bit output data bus of FIFO 402 (FIG. 6) enters the FPGA 400 on the FIFO_RD_DAT bus. The FIFO read data is then converted to 10b data and sent via the bypass mux 408 to the switching element 310 (FIG. 4) on the RCV_DAT bus. The bypass mux 408 also passes primitives to the switch element between frames.

The FPGA 400 also handles outbound frames. A 10b XMIT BYTE signal from the switch element 310 (FIG. 4) is converted to a 9b value by decoder 412 based on its 8b value and whether or not it is a control character. The 9b values are stacked into 36 bit words and sent to the Outbound Frame Processor (OFP) 416 (via the R_RDY detector 414). The OFP 416 remaps the internal D_ID to the FICON D_ID format and recalculates the CRC. The processed frame is then converted from its 36-bit format to 10b format and sent to the connected device through the SERDES 306 (FIG. 4).

The 10b to 9b decode logic 404 takes the 10b code and converts it to an 8b code and appends a $9^{th}$ bit to indicate if the byte is a control byte (K character). It uses K character detection to align a word clock (WD_CLK) at $¼^{th}$ the rate of the local clock. If a coding error is detected, CODE_V is sent to the IFP 406. The 9b characters are then stacked to create a 36-bit word for further processing. The rising edge of the WD_CLK is placed such that it occurs approximately half way between the beginning and end of the output of the 36-bit word.

Figure 8:
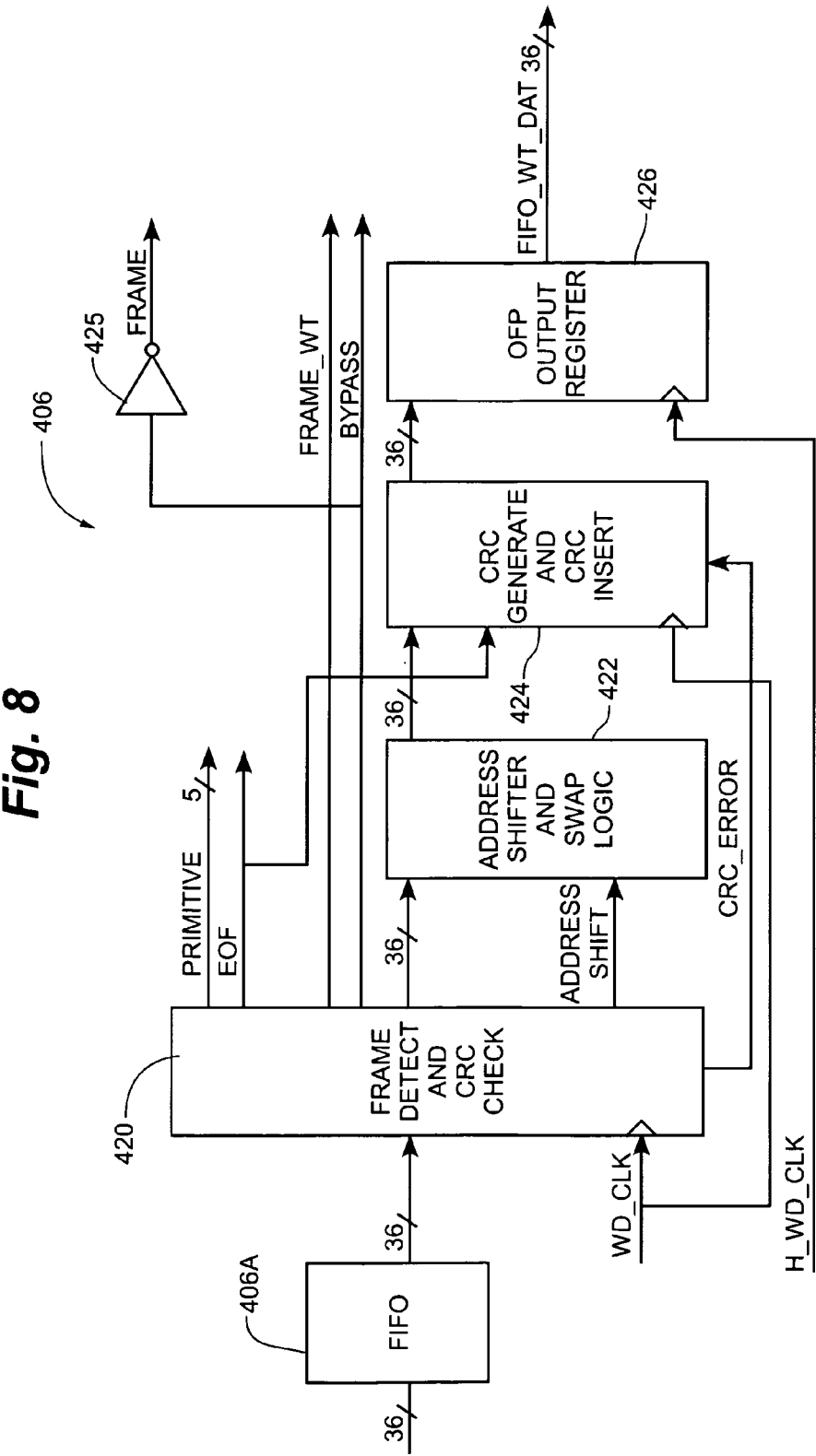
FIG. 8 illustrates an inbound frame processor.

A suitable IFP 406 is shown in FIG. 8. The IFP includes smoothing FIFO 406A, frame detector and CRC checker 420, address shifter and swap logic 422, CRC generator 424, and output register 426. The IFP is responsible to the FIFO controller 410 (FIG. 7) for signaling an incoming frame. The IFP translates the FICON D_ID of the frame header from the FICON value to an internal value that is understood by the switch elements as described herein above. After the translation is complete, the CRC is recalculated and the 36-bit word is sent to the FIFO for buffering.

In operation, a 36-bit word enters the IFP through smoothing FIFO 406A and is passed through the Frame Detect and CRC check logic (FD) 420. Frame CRC checking is generally required on frame entry into the Mapping circuitry. After EOF is asserted, the frame write signal (FRAME_WT) is set active. If the FD detects an R_RDY, the BYPASS signal to the bypass mux 408 (FIG. 7) goes active. BYPASS is asserted whenever there is no frame traffic and the credit FIFO is empty. Using SOF as a reference, the FD asserts ADDRESS SHIFT at the appropriate time to the Address Shifter logic (AS) 422. The FD also detects primitive signals and sequences to provide an output PRIMITIVE signal to the bypass mux 408 (FIG. 7) for processing. If a CRC error or a code violation is detected, the EOF is marked as invalid.

The AS 422 includes logic to provide the mapping of the FICON D_ID to an internal D_ID as described above in relation to FIG. 5A. The AS 422 passes the mapped internal D_ID to the CRC Calculate logic (CRC) 424. However, if the FICON D_ID is a well-known address, ADDRESS SHIFT signal is inhibited.

On reset or power on, the mapping function is disabled and frames are passed to the switch element 310 (FIG. 4) unaltered. The FICON mapping feature is enabled in the FPGA 400 (FIG. 6) upon receipt of a FICON Login Accept frame from the switch element. The mapping feature can also be manually enabled by a control bit from an external configuration processor (not shown).

Frame CRC is recalculated for the mapped internal D_ID by CRC calculator 424. The calculated CRC is inserted in the remapped frame except when CRC error is detected from the FD 420. The clocking scheme of the elements of the IFP is arranged such that when the FD detects an EOF, the CRC word is in the CRC calculator so that the existing CRC value can be overwritten. Once the CRC is modified, the 36-bit word is sent for storage in the credit FIFO 402 (FIG. 6) through output register 426.

The FIFO controller (FIG. 9) includes write logic 430, FIFO output logic 432, and Credit Keeper 434. The FRAME signal, which is active between SOF and EOF, is received by write logic 430 from IFP 406 (FIG. 8). The write logic provides a Write Enable (WT_EN) signal to the FIFO 402 (FIG. 6). The WT_EN signal is inhibited if the signal LESS THAN 8 is active. When this condition exists, the credit FIFO is bypassed. It also provides a Write Clock (WTCLK) which is a buffered LOCAL_CLK divided by 4.

The Credit Keeper (CK) logic 434 keeps track of switch element credit and the extended credit and is described in further detail herein below. As noted above, a credit is an amount of buffer space related to the size of a frame. The FIFO_EOF signal increments the credit counter internal to the CK. NEXT FRAME decrements the count if the FIFO 402 (FIG. 6) is empty. The extended credit counter is incremented by FRAME_WT but is not enabled until the credit counter is 8 or greater. The extended credit counter is decremented by NEXT FRAME when it has a positive value. The FIFO controller 410 outputs the contents of the FIFO whenever the buffer credit is less than 8 and the FIFO is not empty. If the switch element buffer is fall (credit count is 8 or greater), the FIFO controller will not output any more frames until the credit count is less than 8. When the count is less than 8 the LESS THAN 8 signal is active. If the extended credit count is greater than 0, NOT EMPTY is active.

The FOL 432 activates a Read Enable (RD_EN) signal whenever NOT EMPTY is true LESS THAN 8 is true, and the bypass mux 408 (FIG. 7) is not inserting. RD_EN stays true until FIFO_EOF goes true indicating that the frame currently being sent to the switch element has terminated. The Read Clock (RDCLK) is a buffered LOCAL_CLK divided by 4.

Figure 10:
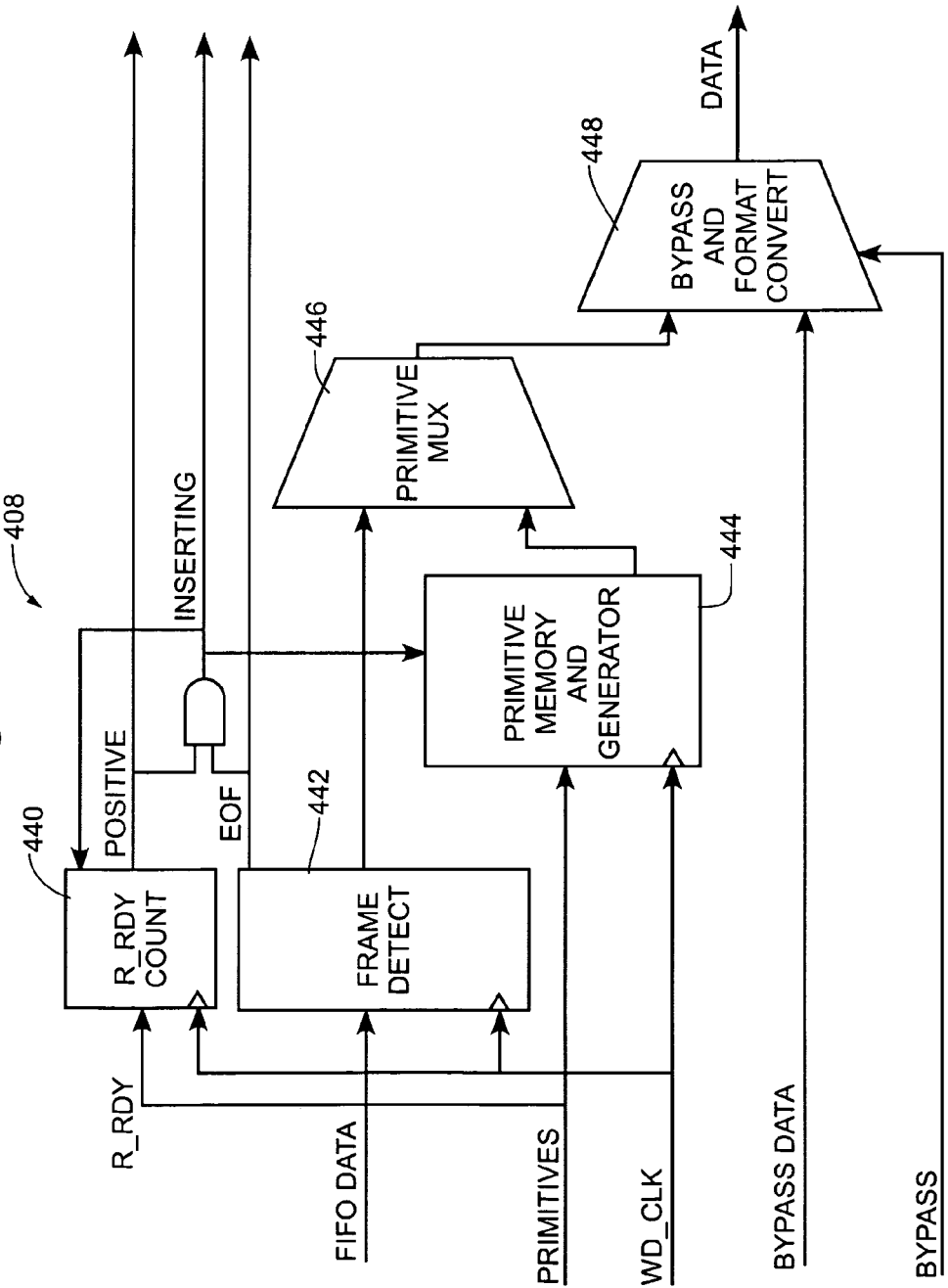
FIG. 10 illustrates a bypass multiplexer.

Referring now to FIG. 10, the bypass mux 408 includes an R_RDY counter 440, frame detector 442, primitive memory and generator 444, primitive multiplexer 446, and bypass format convertor 448. The bypass mux is used to bypass the credit FIFO 402 (FIG. 6) and convert from the 36b format to 10b format. It also inserts R_RDYs between frames.

Figure 9:
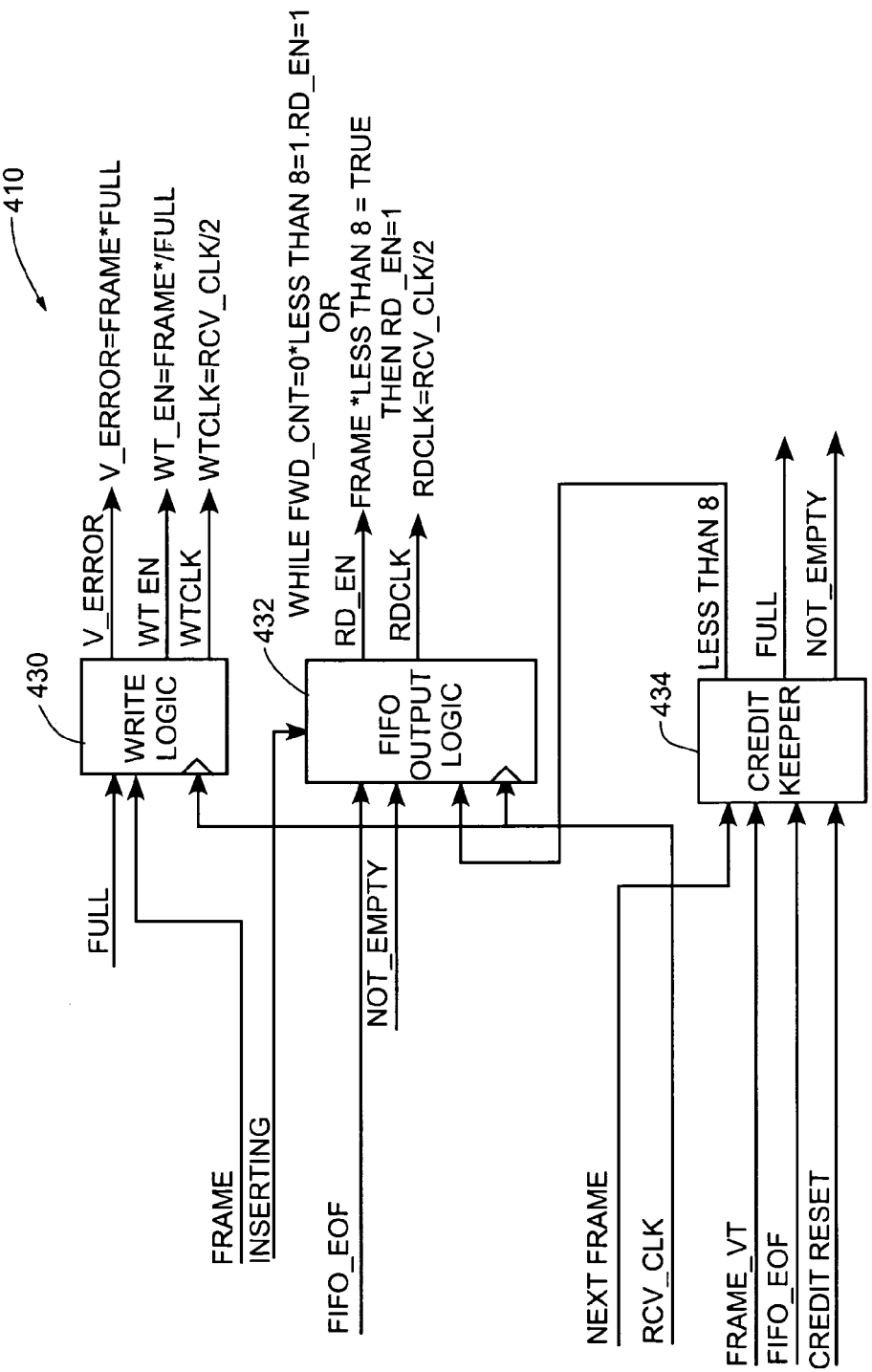
FIG. 9 illustrates a FIFO controller.

The Frame Detect (FD) logic 442 detects EOFs coming from the credit FIFO to enable insertion of an R_RDY into the data to the switch element. The FD must also detect EOF for the FIFO Controller 410 (FIG. 9). When EOF is activated to the FIFO Controller, the FIFO Controller deactivates the FIFO's RD_EN.

The R_RDY Counter (RC) 440 detects R_RDYs from the IFP 406 (FIG. 8) and keeps a record of them. When an EOF is detected, the Primitive Insert logic is activated and the RC 440 is decremented. This process continues until the RC is decremented to zero. Since it is possible to get 180 R_RDYs during a frame, the R_RDY counter will be 8 bits wide.

The Primitive Insert Logic (PIL) consists of the Primitive MUX 446 and the Primitive Memory & Generator logic 444. When the IFP detects a primitive, it activates one of the 5 PRIMITIVE lines to the bypass mux. The PIL remembers the primitive that was detected. If the R_RDY count is non zero an R_RDY will be inserted to the switch element at the next opportunity (between SOF and EOF). If an OLS, NOS, LR, or LRR is detected, a bit is set to remember its reception and the sequence is inserted to the switch element at the next opportunity. An R_RDY must be preceded and succeeded by 2 IDLE characters. Other Primitive Sequences require at least 3 repetitions of the Primitive to be valid. The PIL generates these sequences whenever primitives are inserted. The INSERTING signal is used to select the Primitive Signal or Primitive Sequence to the output of the Primitive Mux 446 and is also passed to the FIFO controller to inhibit FIFO output during this time.

If BYPASS is active, the bypass mux 408 passes the 36-bit output of the inbound frame processor to the conversion logic. If BYPASS is inactive, the 36-bit FIFO_RD_DAT bus or the Primitive Sequence is passed to the conversion logic depending on the state of the INSERTING signal. The conversion logic breaks the 36-bit value into 4 9-bit values and performs a 9b to 10b conversion on each 9-bit value for transmission to the switch element.

Referring again to FIG. 7, on the transmit side, the 10b to 9b decode logic 412 takes the 10b code and converts it to an 8b code and appends a $9^{th}$ bit to indicate if the byte is a control byte (K character). It uses K character detection to align a word clock (WD_CLK) at $\frac{1}{4}^{th}$ the rate of the transmit clock. The 9b characters are then stacked in 4s to create a 36-bit word for further processing.

The R_RDY detect logic 414 detects R_RDYs coming from the switch element and generates the NEXT FRAME signal to the FIFO Controller 410.

Figure 11:
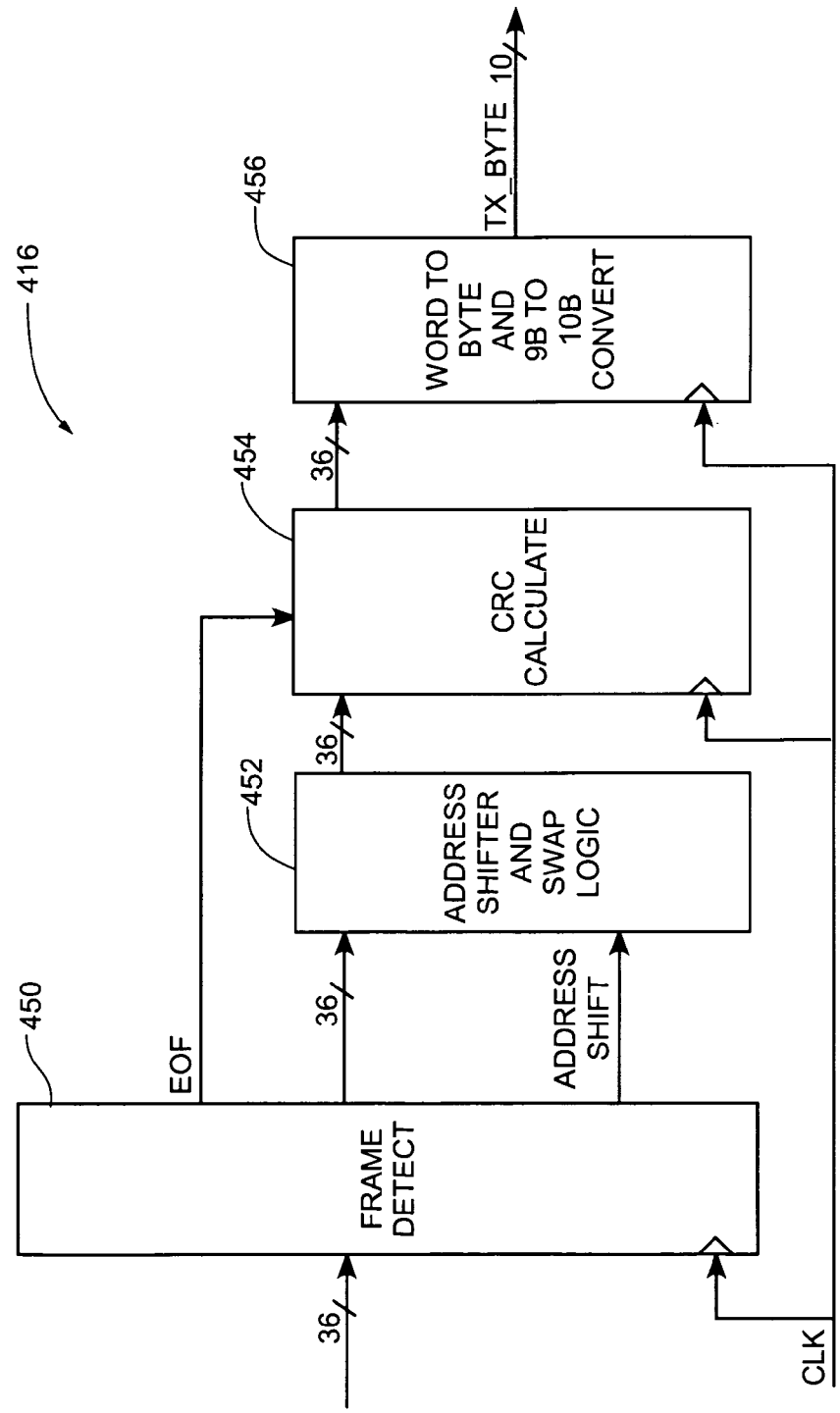
FIG. 11 illustrates an outbound frame processor.

Referring now to FIG. 11, the Outbound Frame Processor (OFP) 416 includes Frame Detector 450, Address shifter 452, CRC calculator 454, and byte converter 456. The OFP 416 remaps the internal D_ID to a FICON D_ID format and recalculates the CRC for outbound frames. The Frame Detect (FD) logic 450 detects SOFs and EOFs. The SOF is used as a reference to generate ADDRESS SHIFT, which causes the ADDRESS SHIFTER logic 452 to translate the internal switch element D_ID to FICON format. Reconstruction of the FICON Address at the switch egress port is preferably the reverse of the operation described above in relation to the Inbound Frame Processor 406 (FIG. 8) except that bits 16–19 of the FICON address are loaded from the Domain Match Register. This mapping is shown in FIG. 5B. Reconstruction of the FICON address generally should not take place for Domain IDs of F0h–FFh. These addresses may appear in a multi-switch fabric.

The Frame CRC is recalculated and replaced in the frame using CRC Calculator 454. Note that this is acceptable since any frame previously found in error will have not been marked with an EOFni delimiter that takes precedence over a valid CRC. The four bit Domain Match Register facilitates detection of ports that do not follow addressing rules set for FICON traffic. The four bits can be any administratively selected value but should generally remain constant for all frames except those of well-known addresses. Detection of domain addresses other than that selected is important since the mapping/remapping process is not reversible for these bits. The register can be loaded by a Configuration processor (not shown) or can be self-setting. The register can self-set by setting to the value of bits 16–19 of the D_ID of an outbound frame having a S_ID of 'FFFFFE' hex. The self-setting feature may also be used to enable address mapping. If the FD logic 450 detects a well-known address, ADDRESS SHIFT is inhibited for the D_ID.

The typical last operation the OFP performs is conversion of the 36-bit word format to 10b format in Converter 456 for transmission to the outbound SERDES 306 (FIG. 4).

Figure 12:
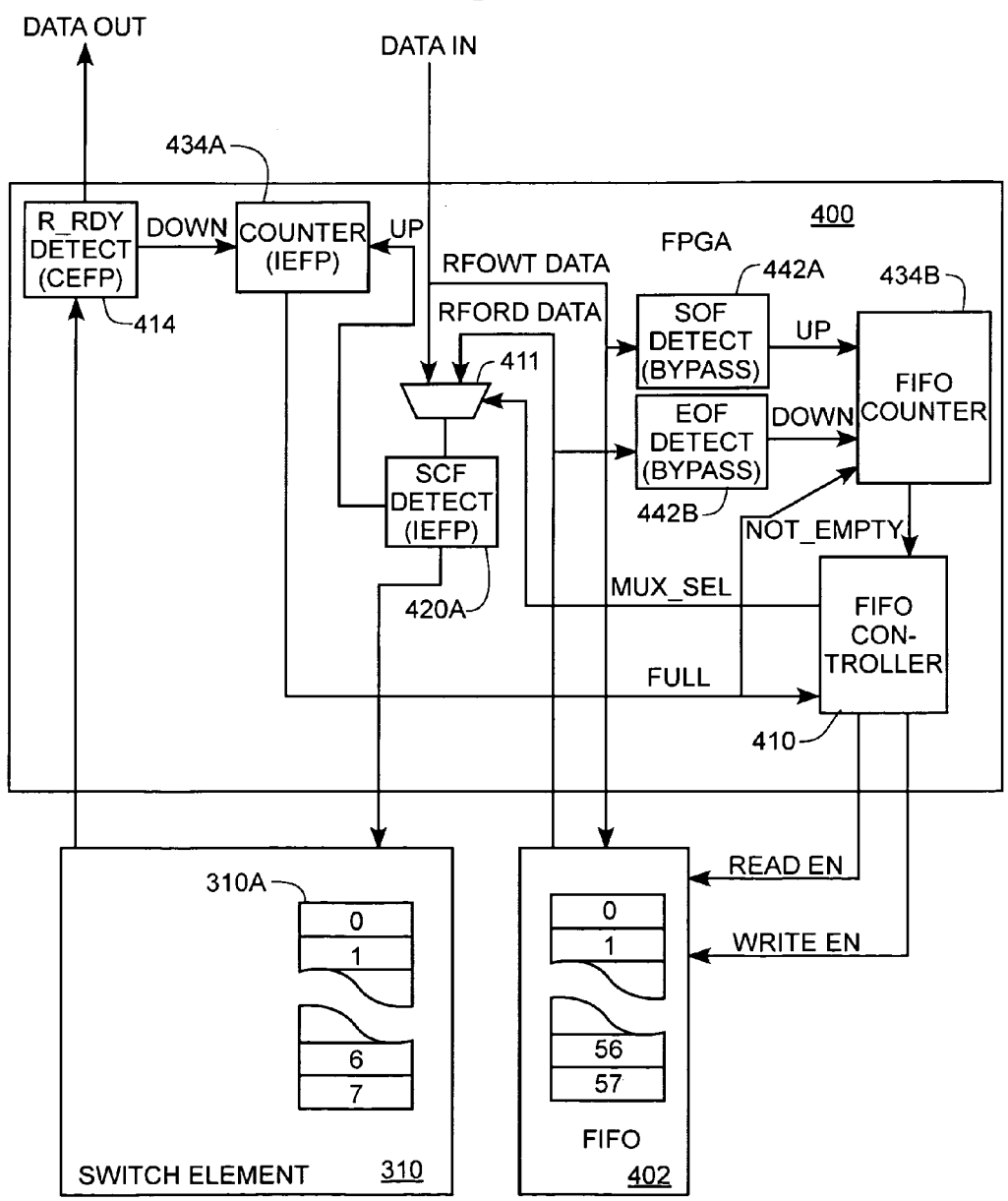
FIG. 12 illustrates a data buffer extension feature of the present system.

Referring now to FIG. 12, operation of the data buffer extension feature of the present system is illustrated. Only those elements introduced in the foregoing description that are needed for describing the feature are shown. As described above, the FPGA 400 includes a FIFO controller 410 and an R_RDY detector 414. Also shown are inbound frame SOF detector 420A, bypass frame SOF detector 442A, bypass frame EOF detector 442B, inbound frame counter 434A and FIFO counter 434B. The FPGA is shown connected to one of the FIFOs 402, though it should be understood from the foregoing description that additional HFOs can be included. An output of the FPGA is also connected to a buffer 310A of the switch element 310. As indicated, the buffer 310A holds up to 8 frames and the FIFO 402 holds up to 58 frames. Multiplexer 411 selects between an inbound frame and a line connected to a read data line from the FIFO 402.

The switch element buffer counter 434A keeps track of the fullness of buffer 310A in the switch element 310. The counter 434A is incremented when the SOF detector 420A detects an SOF for a frame sent to buffer 310A. When the switch element 310 removes a frame from the buffer 310A, it also sends a R_RDY in an outbound frame. The R_RDY detector 414 detects the R_RDY and decrements the counter 434A. Thus, an accurate count of the fullness of buffer 310A is maintained. The FULL signal is asserted whenever the count in counter 434A is 8.

The FIFO counter 434B keeps track of the fullness of FIFO 402. The counter 434B is incremented when the SOF detector 442A detects a SOF for a frame written to FIFO 402. The counter 434B is decremented when the EOF detector 442B detects an EOF for a frame read from FIFO 402. Thus, an accurate count of the fullness of the FIFO 402 is maintained. The NOT_EMPTY signal is asserted whenever the count in FIFO counter 434B is not zero.

There are four states associated with operation of the FIFO controller 410 as indicated by the status of both the FULL and NOT_EMPTY signals.

When FULL is 0 and NOT_EMPTY is 0, this means that the buffer 310A has room to receive one or more frames and that the FIFO 402 is empty. In this state, the FIFO controller does not enable READ or WRITE of the FIFO and the inbound frame passes directly to buffer 310A.

When FULL is 0 and NOT_EMPTY is 1, this indicates again that buffer 310A has room to receive one or more frames. However, NOT_EMPTY equal to 1 indicates that FIFO 402 has buffered frames. Thus, the frame controller 410 enables a READ from the FIFO to move a frame from the FIFO to the buffer 310A. Inbound frames are written to FIFO 402 when stored frames are being transferred from the FIFO to the buffer 310A.

When FULL is 1, this indicates that the buffer 310A currently has no room to accept more frames. Inbound frames are written into FIFO 402, regardless of the status of NOT_EMPTY as long as the buffer 310A is full.

Figure 13:
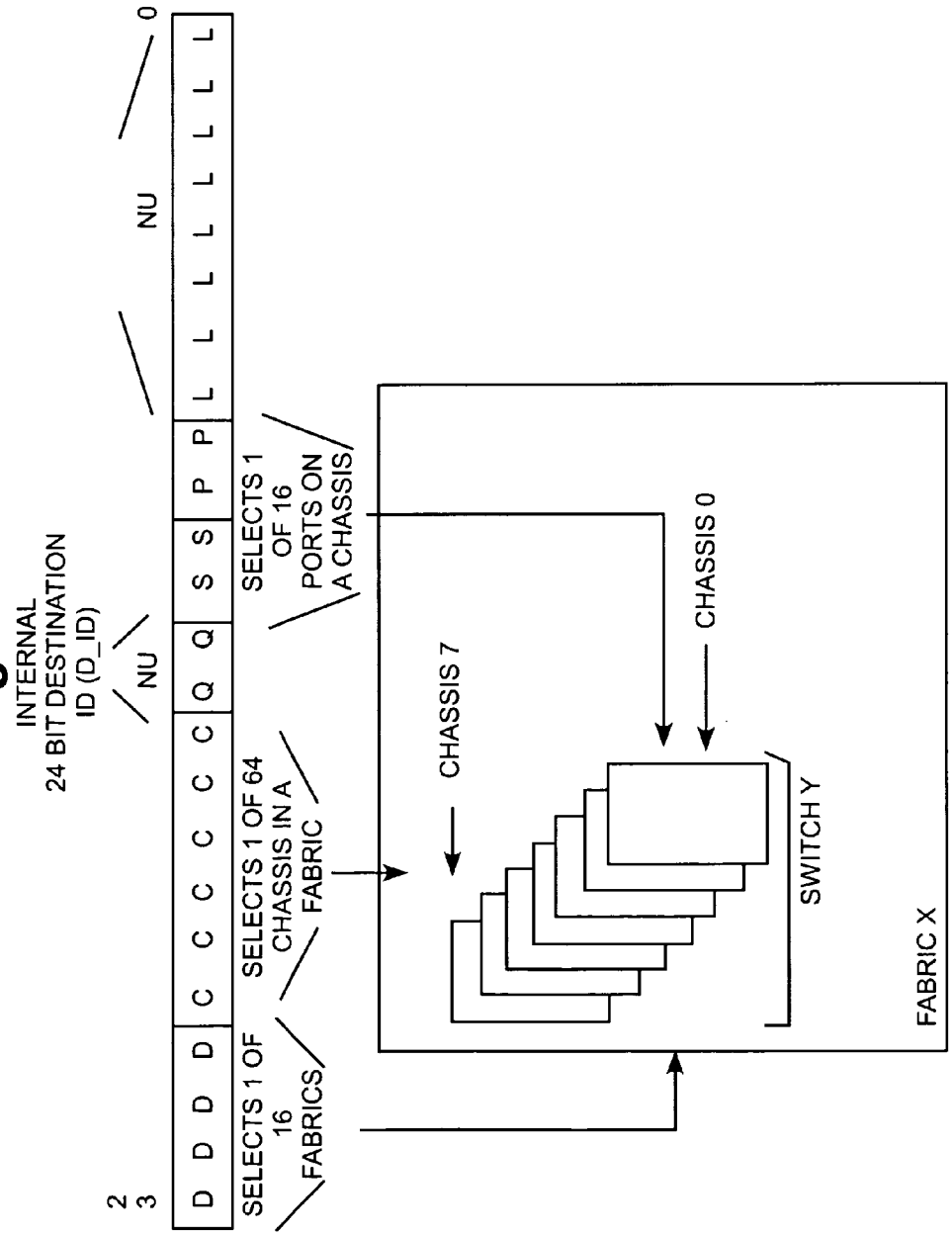
FIG. 13 illustrates a first addressing approach in a switch.

Having described the address mapping feature provided in the first embodiment of an address adaptor (FIG. 4), reference is now made to FIG. 13 which illustrates application of the internal D_ID addressing to a switch fabric labeled X having switches labeled Y. The 4 domain or fabric bits labeled D are used to select one of 16 fabrics. The 6 chassis bits labeled C select one of 64 chassis in a fabric. The combination of the two S bits and the two P bits select one of 16 ports on the chassis. Note that since 8 of the 16 ports are used for chassis intraconnect within the fabric, only the remaining 8 ports are addressable. This is noted by the setting of the least significant P bit to 1 for odd (or to 0 for even) port addressing. In an embodiment of a switch fabric, each physical switch has 8 chassis, each chassis corresponding to a board having 16 ports (8 addressable). Thus, with the internal D_ID addressing, the fabric is limited to 8 physical switches with the number of internal addresses given by:

64 chassis/fabric*8 ports/chassis=512 ports/fabric

Figure 14:
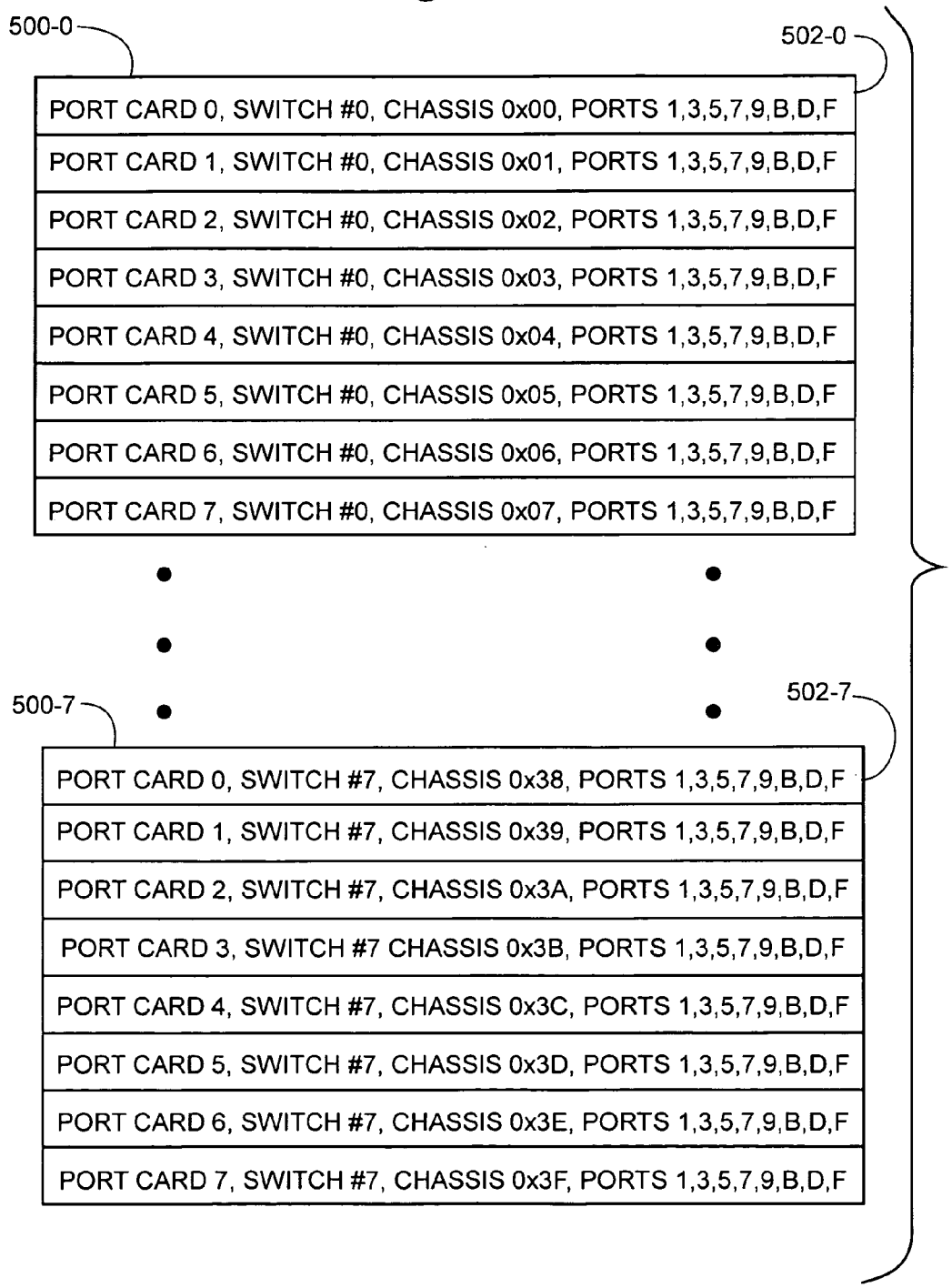
FIG. 14 illustrates the addressing of FIG. 13 in relation to a multi-switch fabric.

FIG. 14 illustrates the addressing of FIG. 13 in relation to an exemplary multi-switch fabric configuration. As shown, the fabric includes 8 physical switches 500-0 to 500-7. The switch 500-0 includes eight chassis boards 502-0. Likewise, switch 500-7 includes eight chassis boards 502-7. Thus, the fabric provides for switching among 64 chassis boards.

Another desirable feature when aggregating several switches into a larger switch fabric is to be able to identify the aggregated switch as a single homogeneous switch fabric rather than several small switches. For example, as described above, a chassis can be identified by a 6-bit chassis address, which allows up to 64 of these chassis to be tied together in a single fabric. By embedding these chassis addresses into the destination ID (D_ID) of the frame header, frames of data can be routed from switch to switch within the fabric to its eventual destination. However, this requires that the user of the fabric be familiar with the internal workings and nuances of the fabric topology.

In order to relieve the user of this task, in accordance with another aspect of the present approach, an expanded address mapping mechanism is provided that allows an alias (logical) switch address to be used in place of all physical chassis addresses within the fabric. This allows the user to embed a fabric address and a port number within the destination D_ID and expect the frame to get there. At the fabric ingress, the logical switch address is modified to the different chassis addresses within the switch. At the fabric egress, the original fabric alias that was modified at the ingress is restored so as to make the internal fabric functions transparent to the user. Circuitry described further herein includes a chassis size register to indicate the overall number of ports in the system, a chassis address match register, which contains the fabric's logical address, and a reserved address register which contains the physical chassis addresses of the switches within the fabric.

Figure 15:
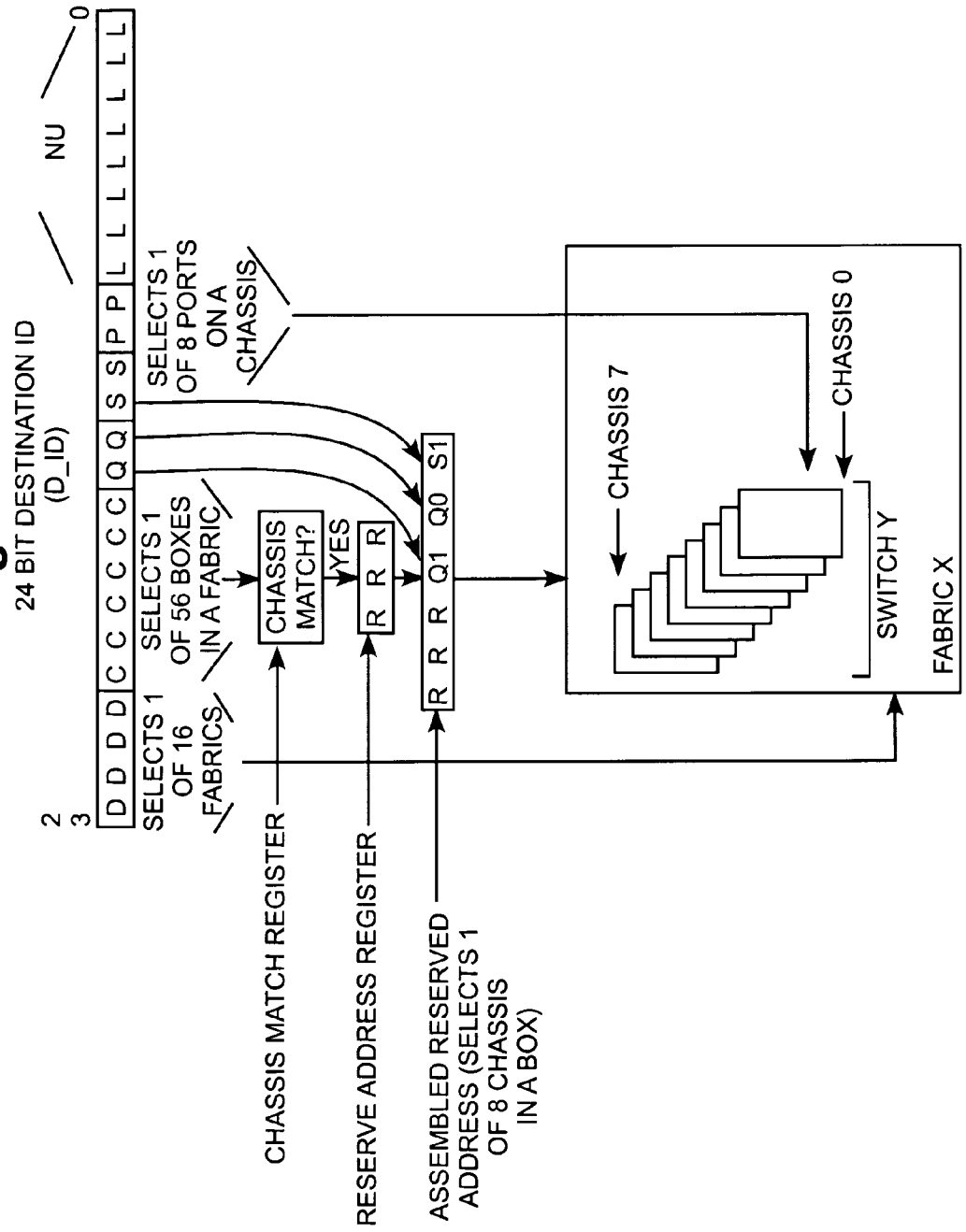
FIG. 15 illustrates a second addressing approach in a switch.

Referring to FIG. 15, the expanded address mapping mechanism is shown. The destination D_ID at the top of FIG. 15 is a FICON D_ID shown in relation to the internal D_ID format described above. When a frame enters the fabric, the chassis address bits of the destination D_ID are compared with the chassis address match register. If the values match, part of the port address within the D_ID is concatenated with the reserved chassis address from the reserved chassis address register to create the chassis address of the switch within the fabric that the frame is destined for. The chassis size register determines what portion of the port address is used when concatenating it with the reserved address register. If the values do not match, indicating that the frame is not destined for a port within this fabric, the frame is forwarded unmodified to a trunk port that connects to other fabrics.

When a frame exits the fabric the frame header's D_ID is compared against the reserved address register to determine if the frame header's D_ID was modified at the ingress. If it was, the modified D_ID is replaced with the contents of the chassis address register.

FIG. 15 shows the expanded address mapping feature applied to a switch fabric labeled X having switches labeled Y. With this expanded approach, 8 chassis addresses (e.g., #56–63) of the 64 chassis addresses are reserved for use internal to each switch. That is, these 8 reserved chassis addresses cannot be used external to the switch. This allows 56 chassis addresses to be used externally. Since each physical switch has one of the 56 chassis addresses, each chassis can contain up to 64 ports. Thus, with the expanded D_ID addressing of the present approach, the fabric is able to include 56 physical switches with the number of addresses given by:

56 switches/fabric*8 chassis/switch*8 ports/chassis=3584 ports/fabric

Figure 16:
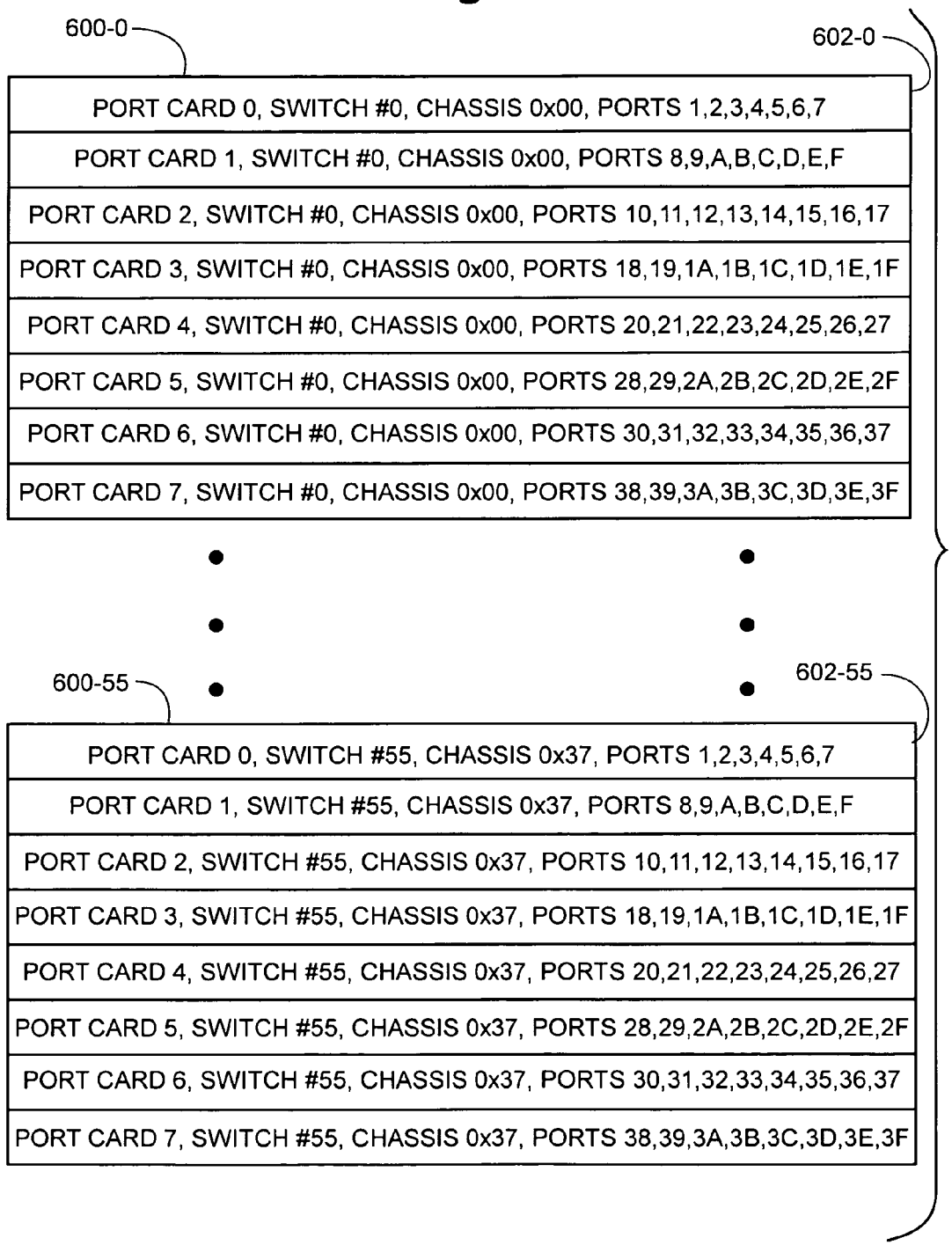
FIG. 16 illustrates the addressing of FIG. 14 in relation to a multi-switch fabric.

FIG. 16 illustrates the addressing of FIG. 15 in relation to an exemplary multi-switch fabric configuration. As shown, the fabric includes 56 physical switches 600-0 to 600-55. The switch 600-0 includes eight boards 602-0. Likewise, switch 600-55 includes eight boards 602-55. Thus, the fabric provides for switching among 448 boards across 56 switches.

Figure 17:
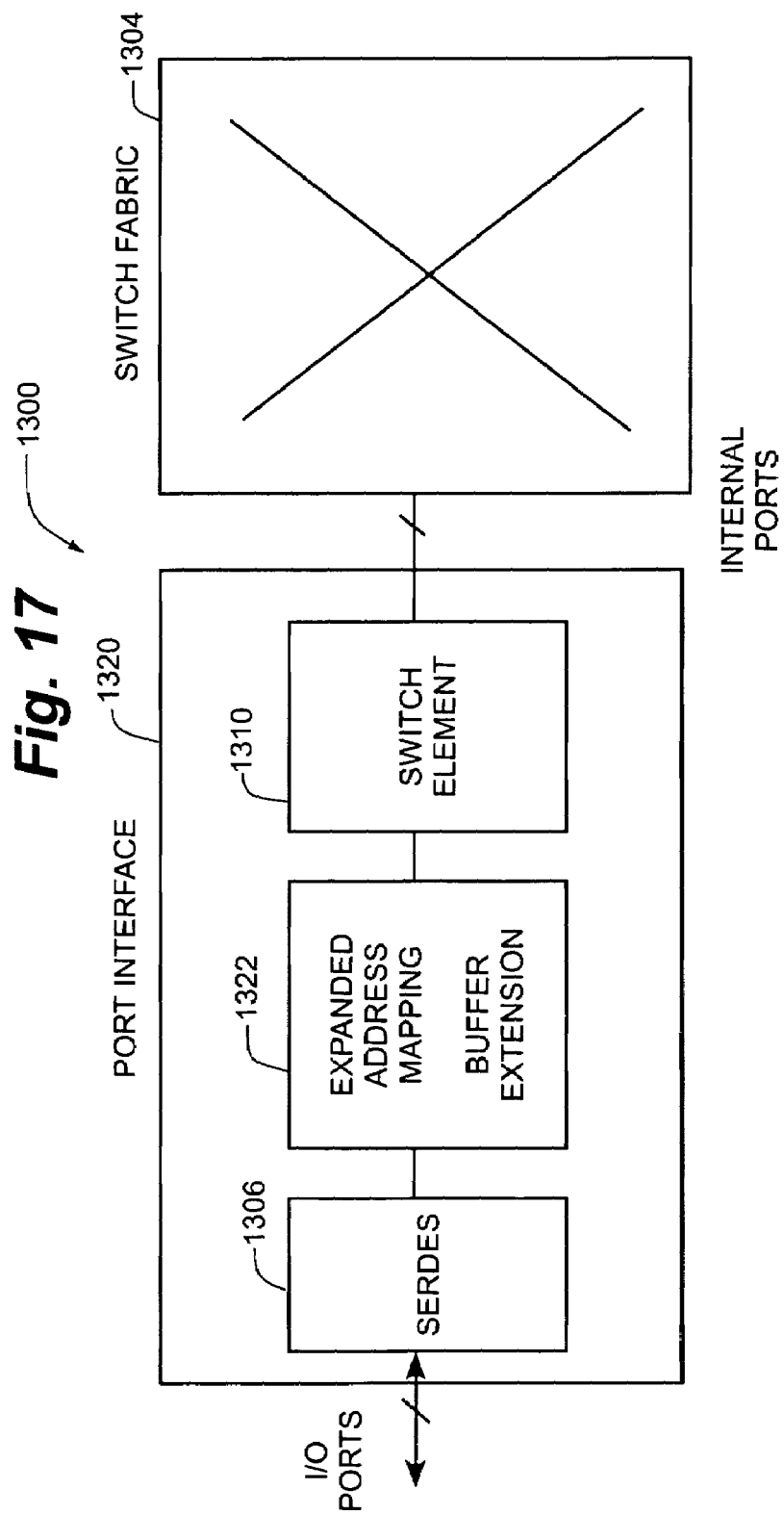
FIG. 17 is a block diagram of a second embodiment of an address adaptor in a switch according to the present system.

Referring to FIG. 17, a second embodiment of an address adaptor operable to provide the expanded address mapping feature described above is shown in the context of a switch 1300. The switch includes a port interface 1320 and switch fabric 1304. The port interface includes SERDES 1306, address adaptor 1322 and switch element 1310. The address adaptor 1322 includes expanded address mapping circuitry in addition to the buffer extension circuitry described above.

The address adaptor 1322 selectively intercepts the fibre channel destination identifier (D_ID) arriving from a link and changes it to a value routable by a switch element. The address adaptor preferably also selectively changes the source identifier (S_ID) to allow Source address checking and meaningful communication with well known switch addresses. An address adaptor according to the present invention facilitates autorouting in the fabric of a multi-protocol channel switch.

Figure 18:
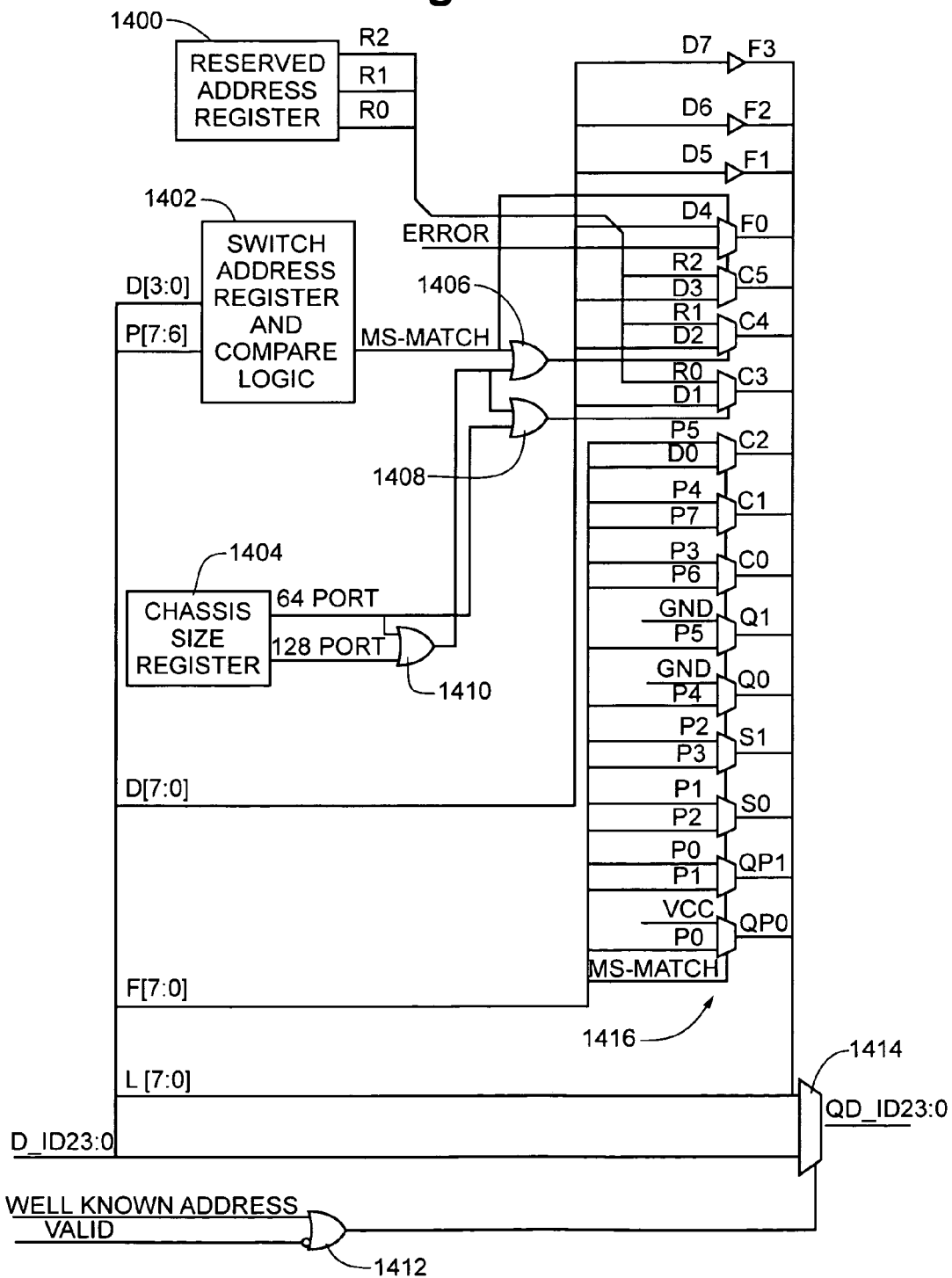
FIG. 18 is a block diagram of ingress logic of the address adaptor of FIG. 17.

FIG. 18 is a block diagram of ingress logic of the address adaptor of FIG. 17. The ingress logic provides the expanded mapping feature described in relation to FIG. 15 above and corresponds to the address shifter logic 422 of the inbound frame processor 406 (FIG. 8). The ingress logic includes reserved address register 1400, switch/chassis address match register and compare logic 1402 and chassis size register 1404. The logic further includes gates 1406, 1408, 1410, 1412 and multiplexers 1414, 1416. The signal D_ID[23:0] shown in FIG. 18 is the destination ID of the inbound frame. The signal QD_ID[23:0] is the output of the expanded mapping feature provided by the logic. The operation of the ingress logic can be understood with reference to the foregoing description of FIG. 15.

Figure 19:
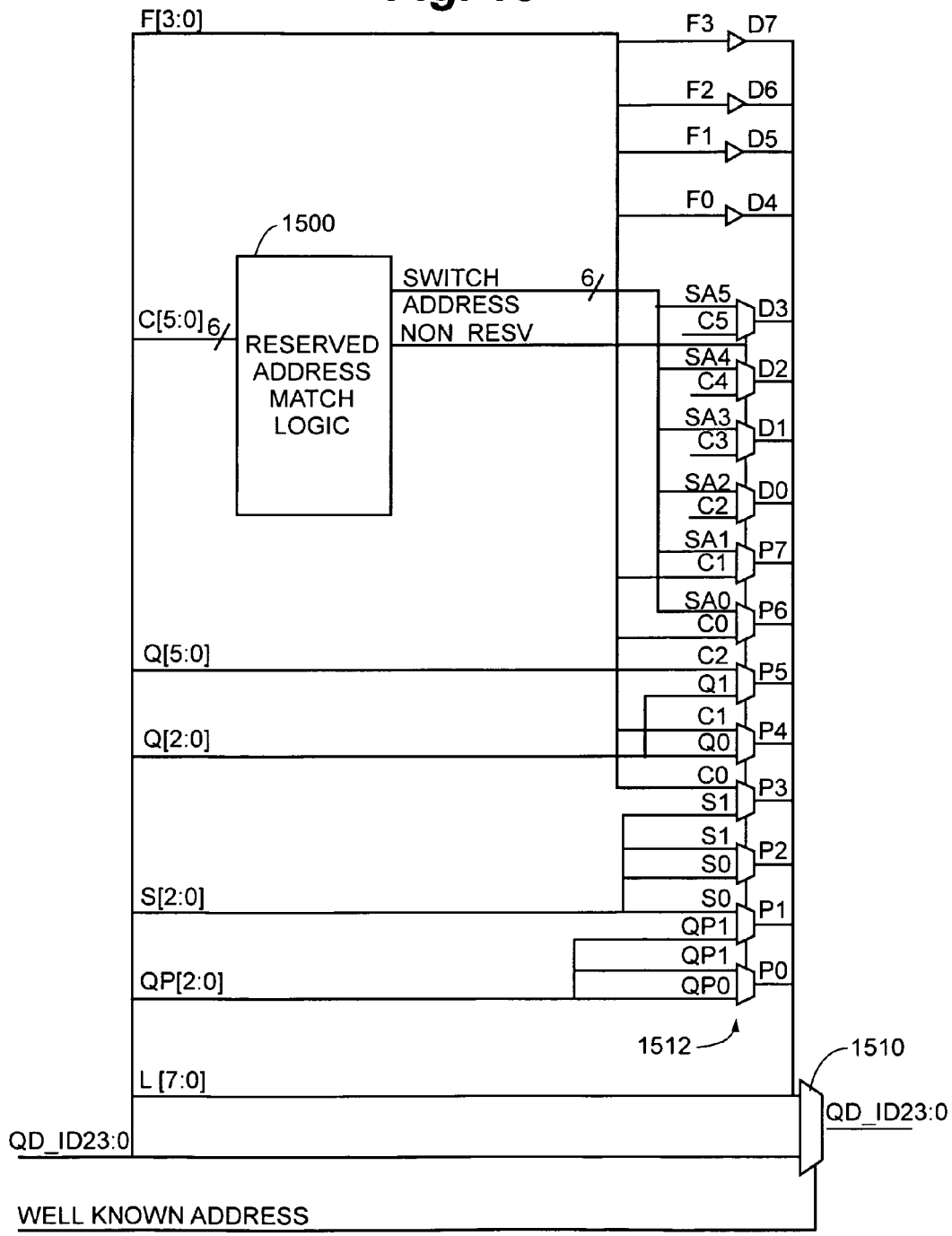
FIG. 19 is a block diagram of egress logic of the address adaptor of FIG. 17.
Figure 20:
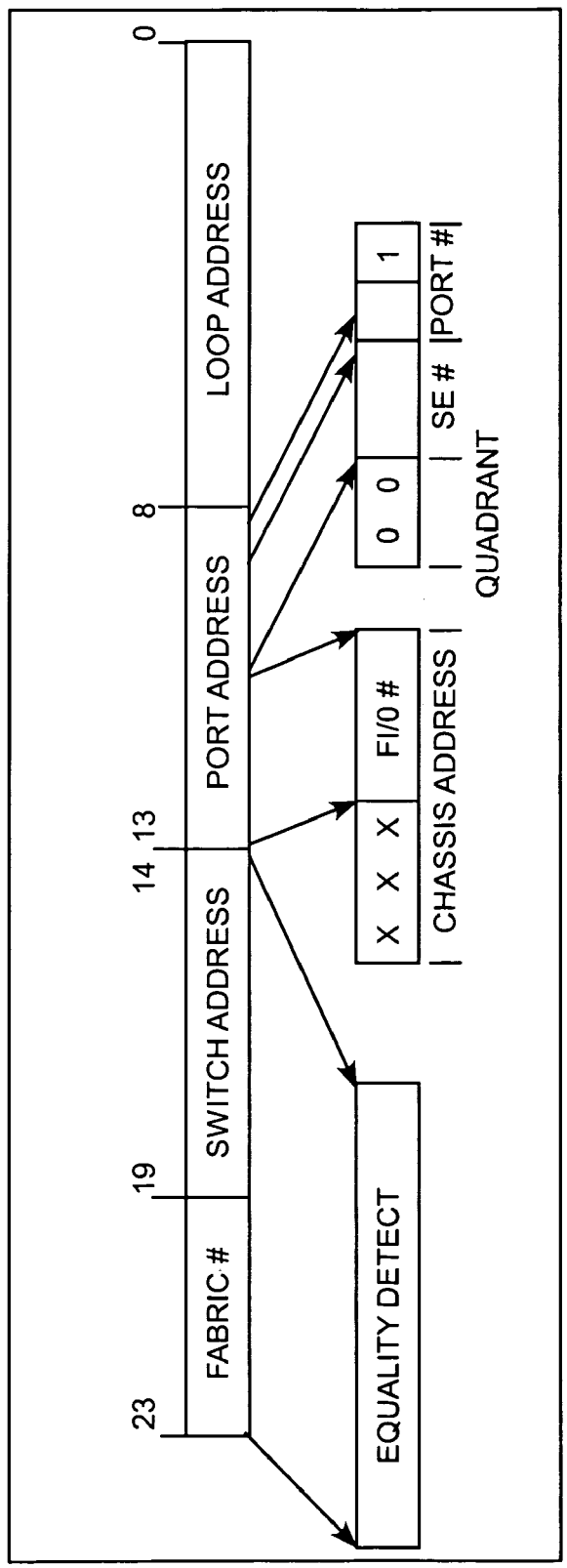
FIG. 20 illustrates a detail of ingress of a fibre channel frame in a 64 port switch according to the present system.

FIG. 19 is a block diagram of egress logic of the address adaptor of FIG. 17. The egress logic provides the reverse mapping described in relation to FIG. 15 and corresponds to the address shifter logic 452 of the outbound frame processor 416 (FIG. 11). The egress logic includes reserved address match logic 1500 and multiplexers 1510, 1512. The signal QD_ID[23:0] shown in FIG. 19 is the expanded destination D_ID of an outbound frame. The signal D_ID[23:0] is the output representing a restored D_ID as described above.

Having described the second embodiment of an address adaptor which provides expanded address mapping, application of this expanded addressing feature is now further described with reference to FIGS. 20–23. In accordance with the present approach a fibre channel destination identifier (D_ID) is partitioned into new groupings which are mapped into physical IDs (PIDs) that the switch can route. For example, the fabric #, bits 23–20, can be used like a domain address and maps directly into bits 23–20 of the new D_ID. The switch element can autoroute only one fabric number. Bits 19–14 are designated switch addresses. Switch addresses are separated into two classes. A group of eight addresses, all having the same three high order bit values are assigned or reserved as internal switch addresses. Each FI/O board in a 64 port switch is assigned one of these addresses. For multiple switches, these same eight addresses can be, and preferably are reused in each switch. Within a fabric, these internal switch addresses are preferably not assigned to external N_Ports. All remaining 7 combinations of the three high order switch address bits together with the permutations of three low order switch address bits are available to be used as part of the assigned N_port address wherein there are given 7×8×64=3584 ports. This class of switch address will be referred to herein as an "assigned switch address." Each switch in a multi-switch fabric is given a unique assigned switch address.

In a preferred embodiment, an address adaptor of the present invention translates both the D_ID and S_ID from assigned switch address to internal switch address only when the fabric number and switch address exactly matches the programmed fabric number and assigned switch address. All other D_IDs and S_IDs are sent to the switch element unchanged. The switch address bit positions correspond to the chassis_ID bit field of the switch element. Since the assigned switch address never matches internal switch addresses, the routing tables of the switch element can be programmed to autoroute the frame to the next hop on the way to the final destination.

When the fabric number and switch address of a frame exactly matches the programmed fabric number and assigned switch address, the port number must be mapped to a PID that the switch element can route. As shown, for example in FIG. 20, the D_ID and S_ID of the fibre channel frame that is to be routed to a final destination within a switch are mapped to a PID in the following steps:

1) Bits 23–20 as well as bits 7–0 remain unaltered.
2) The switch address, which corresponds to the switch element chassis address field, is changed to correspond with a three bit code for the internal switch addresses and the three most significant bits of the port address. The bits coding the internal switch address are designated by X X X in FIG. 20. The three most significant bits of the port address are designated in FIG. 20 as FI/O #. The FI/Os in the switch have chassis numbers equal to the value X X X as the high order three bits concatenated with a FI/O number in the low order three bits.
3) The PID portion of the frame D_ID and S_ID consists of 0 0 loaded into the Q bits, followed by the remaining three bits of the port address forming the switch element number and most significant bit of the switch element port number and lastly a logic 1 loaded into the port LSB.

The mapping described above will cause the port number portion of the D_ID and S_ID to appear as the concatenation FI/O # and port number on the FI/O.

Figure 21:
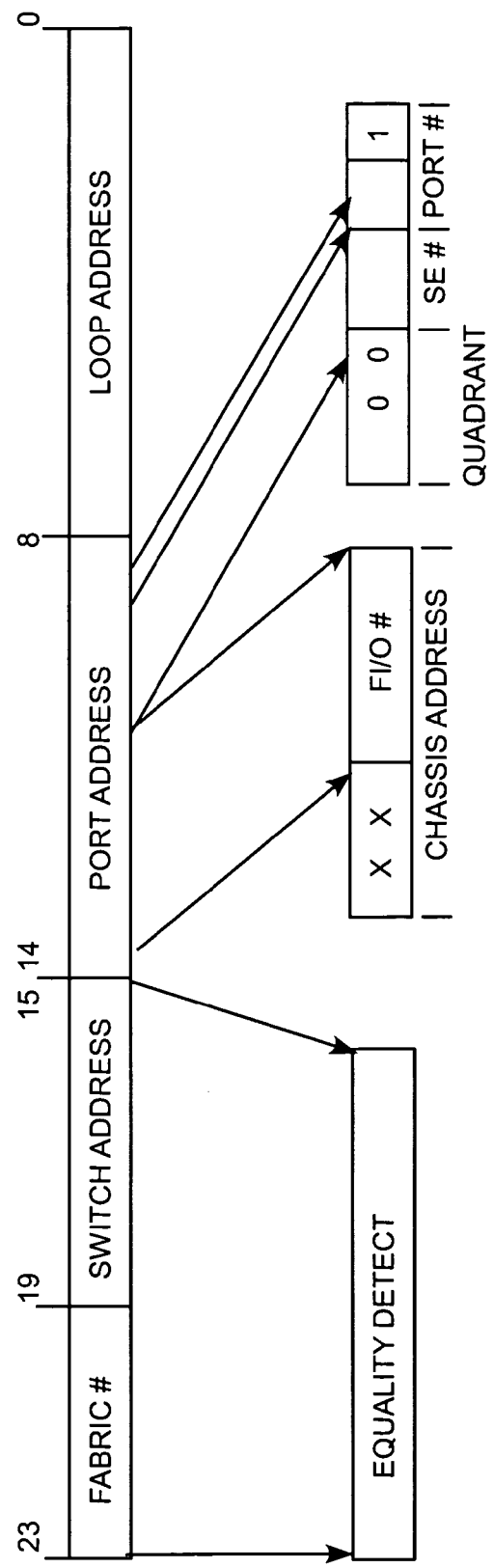
FIG. 21 illustrates a detail of ingress in a fibre channel frame in a 128 port switch according to the present system.

Address mapping for a 128 port switch is similar to that of a 64 port switch. The switch must now reserve 16 switch addresses for internal use, one for each of the 16 FI/Os that may be present. A suitable arrangement for mapping in a 128 port switch is depicted in FIG. 21.

The equality detect function in this configuration generally does not include the fall switch address. The chassis address of the mapped address consists of the two bit code reserved for internal switch addresses, one bit of the switch address and, as before, the three most significant bits of the port address. The PID portion of the address is the same as the 64 port switch.

The free address space in a 128 port configuration comprises three bit combinations not representing X X and the combinations representing the remaining 4 bits of chassis address and port address or 3×16=64=3072. Although the free address space is less for this configuration, it is still desirable since larger blocks of ports are available in a switch and fewer interswitch links will typically be needed between switches.

Figure 22:
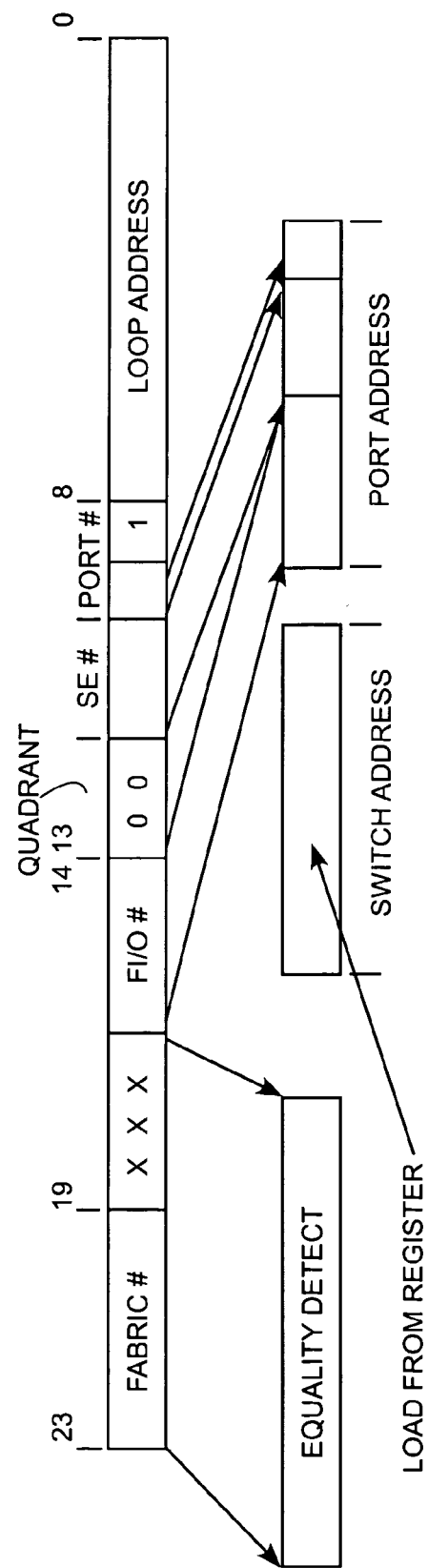
FIG. 22 illustrates a detail of egress in a fibre channel frame in a 64 port switch according to the present system.

When a frame is routed to the final destination port the address must be restored to the original form. A suitable mapping is illustrated in FIG. 22.

Frames exiting the switch where the fabric number and internal switch address range are a match must preferably be re-mapped to their original form. The process generally comprises:
1) The assigned switch address must be loaded into bits 19–14 of the D_ID and S_ID.
2) The port address is reconstructed from bits 16–14 and bits 11–9 of the routed frame. The port address can also be loaded from a register in the address adaptor.
3) The loop address portion of the D_ID or S_ID is unchanged.

The address adaptor can support e.g., 64 and/or 128 port switches, and additional port capabilities are also supportable depending on the application. The address adaptor also checks cyclic redundancy check (CRC) on all frames. When an invalid CRC is detected on a frame that must be mapped, in order to reduce the likelihood of errors, the adaptor must terminate the frame with EOFni or cause a CRC error on the mapped frame. The latter may be desirable to cause the switch element to log and report the inbound CRC error.

The address adaptor is also capable of calculating CRC for mapped frames and replace the old CRC. Arrival of a frame at a switch ingress port bearing one of the reserved internal switch addresses preferably has the SOF delimiter changed to a SOFf to cause it to be routed to a configuration processor.

The address adaptor can be used to implement address sparing in a switch. Address sparing is a process where the port address advertised to the external environment is not the native address of the switch port. Address sparing is typically used to temporarily replace a defective port but retaining the appearance (port number) of the defective port to attached devices. All ports of a switch should preferably participate in this process. Switch ingress ports are preferably capable of replacing the spared port address with the new port address and the egress port must replace its address with the address of the spared port. The address adaptor can substitute at the egress port simply by loading the port address portion of the outbound D_ID from a register as described.

Recognition of a spared port on the ingress ports of the switch may be accomplished in several manners. Two exemplary methods are set forth below:
1) A look up table with 64 entries can be included in the address adaptor. The port address portion of the frame D_ID is used as address index into the table. Each table entry is a six bit PID for the desired egress port of the switch. When address sparing is not in use the table contents are equal to the address value. To effect sparing the contents of the table location corresponding to a spared port are changed to the PID of the designated spare port. Any or all port addresses can be re-assigned with this method. An Address Adaptor that supports more than one port can share the table provided the table acts like a multiport memory.
2) A smaller content addressable memory could be provided whereby if contents of part of the array match the port address, a substitute PID is output. This implementation will allow a limited number of ports to be spared possibly using less device resources.

The address adaptor can facilitate larger fabric configurations by allowing flexible assignment of switch addresses. In this regard, switches that assign a domain ID for each physical entity can be connected to a multi-protocol channel switch in limited numbers. Switches of this type typically can assign any of the 239 addresses from '01h' through 'Efh'. See FIG. 23 for an exemplary illustration of how these addressing plans overlap.

FIG. 23 illustrates that if bits 23–20 of the domain ID are equal and internal switch addresses of 0–7 are selected for the fibre channel switch, fourteen useable domain ID remain. A multi-protocol channel switch with the instantly described address plan will use exactly two domain addresses regardless of the range of internal addresses selected. One of the remaining useable domain ID must be assigned to the channel switch as its assigned switch address and the remaining thirteen may be assigned to switches that use the domain ID as the switch identity. Although the assigned switch address given to the channel switch eliminates one possible domain ID, there are three additional assigned switch addresses having the same four most significant bits.

In order to connect a multi-protocol channel switch to a switch provided with an adaptor according to the present invention, a fabric including a channel switch typically requires each FI/O to have user ports and to have a unique chassis address. The chassis address bits correspond exactly to the switch address. When interconnected, the multi-protocol channel switch will preferably appear as a collection of switch addresses, one for each FI/O present, to a switch with address adaptor according to the present invention. The switch including an address adaptor will appear to the other switch as a single chassis address. Address(es) selected for internal switch addresses are preferably not assigned to any of addresses used by the other channel switch.

If a storage area network (SAN) is employed, the situation is similar. That is, each switch device will typically include one switch address, which should be set as the chassis ID. A switch including an address adaptor according to the present invention will appear as a single Chassis Address. Address selected for internal switch addresses are preferably not be assigned to any of the switch devices.

Similarly, if a multi-protocol channel switch is employed having FI/Os with and without the inclusion of an address adaptor, FI/Os with and without an address adaptor can be mixed in a multi-protocol channel switch. The resultant situation is set forth below. A port will preferably have a different address when accessed from different FI/O types. A port will be accessed by one address from all address adapted ports and by a different address from non-adapted ports. Likewise, a non-adapted port will appear as one address to all other non-adapted ports and a different address to adapted ports. Care should be taken to avoid duplicate addresses.

Moreover, all address adapted ports in a multi-protocol channel switch will preferably have the same Assigned Switch Address. From this perspective, switch addresses are conserved. Non-Adapted FI/Os should preferably be assigned unique chassis addresses thereby consuming one switch address each.

It is believed that using domains might be incompatible with the current switches. As such, it is preferable in the context of the present invention to regain the quadrant addressing lost. For example, with a 64 port switch, it is suitable to reserve 8 of the 64 chassis bits. Then every 64 port switch would have internal addressing with those 8 chassis. On the outside of the system (for example, in an FPGA) the address is "spoofed" as though it were a single 64 port chassis (i.e. ports 0–63). As such, there would be 56 chassis addresses remaining. These 56 chassis addresses could be used, for example, by 64, 16 or 8 port boxes. Any frames entering or leaving a 64 port switch with a source or destination address that is one of the shared 8 chassis, could get remapped, for example, at an inbound or outbound port. Appropriate modifications to software is also required and could be accomplished by one of skill in the art according to known techniques.

According to one aspect of the system, internal routing is always one set of the chassis, but it is also advantageous to know the external chassis number. As such, since every chassis (externally) is unique, the present approach is capable of working with any multi-protocol channel switch. Likewise, for a 128 port switch employed in the fabric, it is desirable to reserve, for example, 16 chassis addresses. This gives 48 chassis total but each 128 port switch uses up 2. Thus there are up to 24, 128 ports connected together. Similarly, in a 256 switch environment, it is advantageous to reserve 32 chassis per fabric, wherein each 256 port switch uses 4 chassis IDs, up to a maximum of 8. These can also be combined with other switches. In a 64 port switch, it is possible in some embodiments to remap 64 addresses, 128 addresses in a 128 port switch and 256 addresses in a 256 port switch.

The address adaptor can be used alone, or in combination with one or more other similar address modification products or methods to achieve desired results under various circumstances.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing a connection between a source endpoint and a destination endpoint through a fibre channel switch, the method comprising:
   receiving FICON frames at the ingress port of a fibre channel switch from a source endpoint, each frame having a header that includes twenty-four bit FICON address information;
   mapping the FICON address information of each received FICON frame to twenty-four bit internal address information at the ingress port to provide internal frames;
   switching the internal frames through the fibre channel switch to an egress port according to the internal address information;
   and mapping the internal address information of each internal frame to the FICON address information at the egress port for transmission to the destination endpoint.

2. The method of claim 1 wherein the FICON address information comprises a FICON destination address and the internal address information includes an internal destination address and wherein mapping the FICON address information includes mapping the FICON destination address to an internal destination address.

3. The method of claim 2 wherein the FICON destination address includes an 8 bit domain field, an 8 bit port field and an 8 bit loop field and wherein the internal destination address includes a 4 bit fabric field, a 6 bit chassis field, a 2 bit switch field, a 2 bit internal port field and an 8 bit internal loop field.

4. The method of claim 3 wherein mapping the FICON destination address to the internal destination address includes mapping the four most significant bits of the domain field to the 4 bit fabric field, mapping the least significant bit of the domain field and the five most significant bits of the port field to the 6 bit chassis field, mapping the three least significant bits of the port field to the 2 bit switch field and the most significant bit of the internal port field, setting the least significant bit of the internal port field to 0 for even addressing or to 1 for odd addressing, and mapping the 8 bit loop field to the 8 bit internal loop field.

5. The method of claim 3 wherein mapping the internal destination address to the FICON destination address includes mapping an 8 bit domain address from a domain address register to the 8 bit domain field, mapping the five least significant bits of the chassis field to the five most significant bits of the 8 bit port field, mapping the 2 bit switch field and the most significant bit of the internal port field to the three least significant bits of the 8 bit port field, and mapping the 8 bit internal loop field to the 8 bit loop field.

6. The method of claim 1 wherein the fibre channel switch is one of a plurality of fibre channel switches of a fibre channel switch fabric and further comprising preassigning a chassis address to the fibre channel switch, each chassis having a specific switch address that is different from the preassigned chassis address.

7. The method of claim 6 further comprising providing in the fibre channel switch a chassis size register to indicate the overall number of ports in the switch fabric, a chassis address match register that includes a logical chassis address, and a reserved chassis address register that includes a physical chassis address of switches within the switch fabric.

8. The method of claim 7 wherein the FICON address information includes a destination D_ID and mapping the FICON address information includes comparing the chassis address bits of the destination D_ID with the chassis address match register and, upon a match, concatenating a portion of the port address in the D_ID with the reserved chassis address from the reserved chassis address register to provide an internal chassis address of the switch within the fabric.

9. The method of claim 8 wherein mapping the internal address information includes comparing the internal chassis address against the reserved address register and inserting the contents of the chassis address register into the destination D_ID.

10. The method of claim 7 wherein the reserved chassis address includes 8 addresses and the chassis size register indicates 64 ports.

11. The method of claim 7 wherein the reserved chassis address includes 16 addresses and the chassis size register indicates 128 ports.

12. The method of claim 7 wherein the reserved chassis address includes 32 addresses and the chassis size register indicates 256 ports.

13. The method of claim 7 wherein the FICON address information includes a destination D_ID and mapping the FICON address information includes mapping a logical port address in the destination D_ID to a spared port address from a lookup table.

14. The method of claim 1 wherein the FICON frame includes a cyclic redundancy check (CRC) and wherein mapping the FICON address information to internal address information includes recalculating the CRC and inserting the recalculated CRC into the internal frame.

15. The method of claim 14 wherein mapping the internal address information to FICON address information includes recalculating the CRC and inserting the recalculated CRC into the FICON frame at the egress port.

16. A switch for providing a connection between a source endpoint and a destination endpoint, the switch comprising:
an ingress port for receiving inbound FICON frames from a source endpoint, each frame having a header that includes FICON address information;
an address adaptor for mapping the FICON address information of each received FICON frame to internal address information to provide internal frames, the address adapter changing the address information within the FICON frame by replacing the FICON address information with the internal address information;
and a switch element for switching the internal frames according to the internal address information.

17. The switch of claim 16 wherein the FICON address information comprises a FICON destination address and the internal address information includes an internal destination address and wherein the address adaptor is operable to map the FICON destination address to an internal destination address.

18. The switch of claim 17 wherein the FICON destination address includes an 8 bit domain field, an 8 bit port field and an 8 bit loop field and wherein the internal destination address includes a 4 bit fabric field, a 6 bit chassis field, a 2 bit switch field, a 2 bit internal port field and an 8 bit internal loop field.

19. The switch of claim 18 wherein the address adaptor is operable to map the FICON destination address to the internal destination address by mapping the four most significant bits of the domain field to the 4 bit fabric field, mapping the least significant bit of the domain field and the five most significant bits of the port field to the 6 bit chassis field, mapping the three least significant bits of the port field to the 2 bit switch field and the most significant bit of the internal port field, setting the least significant bit of the internal port field to 0 for even addressing or to 1 for odd addressing, and mapping the 8 bit loop field to the 8 bit internal loop field.

20. The switch of claim 16 further comprising a second address adaptor for mapping the internal address information of each internal frame to the FICON address information to provide outbound FICON frames and an egress port for transmitting the outbound FICON frames to a destination endpoint.

21. The switch of claim 20 wherein the FICON address information comprises a FICON destination address and the internal address information includes an internal destination address and wherein the second address adaptor is operable to map the internal destination address to a FICON destination address.

22. The switch of claim 21 wherein the second address adaptor is operable to map the internal destination address to the FICON destination address by mapping an 8 bit domain address from a domain address register to the 8 bit domain field, mapping the five least significant bits of the chassis field to the five most significant bits of the 8 bit port field, mapping the 2 bit switch field and the most significant bit of the internal port field to the three least significant bits of the 8 bit port field, and mapping the 8 bit internal loop field to the 8 bit loop field.

23. The switch of claim 16 wherein the switch is one of a plurality of fibre channel switches of a fibre channel switch fabric and wherein a chassis address is preassigned to the fibre channel switch, each chassis having a specific switch address that is different from the preassigned chassis address.

24. The switch of claim 23 wherein the address adaptor further comprises a chassis size register to indicate the overall number of ports in the switch fabric, a chassis address match register that includes a logical chassis address, and a reserved chassis address register that includes a physical chassis address of the switch.

25. The switch of claim 24 wherein the FICON address information includes a destination D_ID and wherein the address adaptor is operable to map the FICON address information by comparing the chassis address bits of the destination D_ID with the chassis address match register and, upon a match, concatenating a portion of the port address in the D_ID with the reserved chassis address from the reserved chassis address register to provide an internal chassis address of the switch within the fabric.

26. The switch of claim 25 wherein the reserved chassis address includes 8 addresses and the chassis size register indicates 64 ports.

27. The switch of claim 25 wherein the reserved chassis address includes 16 addresses and the chassis size register indicates 128 ports.

28. The switch of claim 25 wherein the reserved chassis address includes 32 addresses and the chassis size register indicates 256 ports.

29. The switch of claim 16 wherein the FICON address information includes a destination D_ID and wherein the address adaptor is operable to map a logical port address in the destination D_ID to a spared port address from a lookup table.

30. The switch of claim 16 wherein the FICON frame includes a cyclic redundancy check (CRC) and wherein the address adaptor is operable to recalculate the CRC and insert the recalculated CRC into the internal frame.

31. In a fibre channel switch, an address adaptor comprising:
  an inbound frame processor for receiving inbound frames from a source endpoint, each inbound frame having a header that includes first address information having a first format, the inbound frame processor including address logic for mapping the first address information of each received inbound frame to second address information having a second format to provide inbound internal frames to a switch fabric, the address logic changing the address information in the header of the first frame by replacing the first address information with the second address information;
  and an outbound frame processor for receiving outbound internal frames from a switch fabric, the outbound frame processor including address logic for changing the second address information within the frame header of each outbound internal frame to first address information having the first format to provide outbound frames for transmission to a destination endpoint.

32. The address adaptor of claim 31 wherein the first format has continuous addressing and the second format has discontinuous addressing.

33. The address adaptor of claim 31 wherein the first format is FICON format and the second format is an internal format.

34. The address adaptor of claim 33 wherein the FICON address information comprises a FICON destination address and the internal address information includes an internal destination address and wherein the address adaptor is operable to map between a FICON destination address to an internal destination address.

35. The address adaptor of claim 34 wherein the FICON destination address includes an 8 bit domain field, an 8 bit port field and an 8 bit loop field and wherein the internal destination address includes a 4 bit fabric field, a 6 bit chassis field, a 2 bit switch field, a 2 bit internal port field and an 8 bit internal loop field and wherein the address adaptor is operable to map the FICON destination address to the internal destination address by mapping the four most significant bits of the domain field to the 4 bit fabric field, mapping the least significant bit of the domain field and the five most significant bits of the port field to the 6 bit chassis field, mapping the three least significant bits of the port field to the 2 bit switch field and the most significant bit of the internal port field, setting the least significant bit of the internal port field to 0 for even addressing or to 1 for odd addressing, and mapping the 8 bit loop field to the 8 bit internal loop field.

36. The address adaptor of claim 35 wherein the address adaptor is operable to map the internal destination address to the FICON destination address by mapping an 8 bit domain address from a domain address register to the 8 bit domain field, mapping the five least significant bits of the chassis field to the five most significant bits of the 8 bit port field, mapping the 2 bit switch field and the most significant bit of the internal port field to the three least significant bits of the 8 bit port field, and mapping the 8 bit internal loop field to the 8 bit loop field.

37. The address adaptor of claim 31 for use in a fibre channel switch fabric comprising at least one switch and at least one chassis, wherein all or a portion of the switches in the fabric are preassigned a chassis address, and each chassis has a specific switch address that is different from the preassigned chassis address.

38. The address adaptor of claim 37 wherein the address logic of the inbound frame processor includes a chassis size register to indicate the overall number of ports in the switch fabric, a chassis address match register that includes a logical chassis address, and a reserved address register that includes a physical chassis address of switches within the switch fabric.

39. The address adaptor of claim 38 wherein the FICON address information includes a destination D_ID and the address logic is operable to map the FICON address information by comparing the chassis address bits of the destination D_ID with the chassis address match register and, upon a match, concatenating a portion of the port address in the D_ID with the reserved chassis address from the reserved chassis address register to provide an internal chassis address of the switch within the fabric.

40. The address adaptor of claim 39 wherein the reserved chassis address includes 8 addresses and the chassis size register indicates 64 ports.

41. The address adaptor of claim 39 wherein the reserved chassis address includes 16 addresses and the chassis size register indicates 128 ports.

42. The address adaptor of claim 39 wherein the reserved chassis address includes 32 addresses and the chassis size register indicates 256 ports.

43. The address adaptor of claim 37 wherein the FICON address information includes a destination D_ID and wherein the address adaptor is operable to map a logical port address in the destination D_ID to a spared port address from a lookup table.

44. The address adaptor of claim 31 wherein the inbound frame includes a cyclic redundancy check (CRC) and wherein the inbound frame processor is operable to recalculate the CRC and insert the recalculated CRC into the inbound internal frame.

45. The address adaptor of claim 44 wherein the outbound frame processor is operable to recalculate the CRC and insert the recalculated CRC into the outbound frame.

46. A switch for providing a connection between a source endpoint and a destination endpoint, the switch comprising:
  means for receiving FICON frames from a source endpoint, each frame having a header that includes a FICON destination address;
  means for mapping the FICON destination address of each received FICON frame to an internal destination address to provide internal frames and changing the FICON destination address in the header by replacing it with the internal destination address;
  means for switching the internal frames through the switch according to the internal destination address;
  and means for mapping the internal destination address of each internal frame to the FICON destination address for transmission to the destination endpoint.

47. A method for providing a connection between a source endpoint and a destination endpoint through a data switch, the method comprising:

receiving inbound frames at the ingress port of the data switch from a source endpoint, each frame having a header that includes first destination address information;

mapping the first destination address information of each received frame to internal destination address information at the ingress port to provide internal frames;

replacing the first destination address information in the header of each received frame with the internal destination address information;

switching the internal frames through the data switch to an egress port according to the internal destination address information;

and replacing the internal destination address information of each internal frame in the frame header with the first destination address information at the egress port for transmission to the destination endpoint.

48. A switch for providing a connection between a source endpoint and a destination endpoint, the switch comprising:

an ingress port for receiving inbound frames from a source endpoint, each frame having a header that includes first destination address information;

an address adaptor for changing the first destination address information in the header of each received frame to internal address information to provide internal frames;

and a switch element for switching the internal frames according to the internal address information without adding additional headers onto the internal frames.

49. A method for providing a connection between a source endpoint and a destination endpoint through a network of data switches, the method comprising:

receiving inbound frames at the ingress port of a first data switch in the network from a source endpoint, each frame having a header that induces first destination address information;

mapping the first destination address information of each received frame to internal destination address information at the ingress port to provide internal frames;

changing the destination address information in the header of each received frame into the mapped internal destination address information;

switching the internal frames through the network of data switches to an egress port of a second data switch in the network according to the internal destination address information;

and mapping the internal destination address information of each internal frame to the first destination address information at the egress port for transmission to the destination endpoint.

50. A network of data switches for providing a connection between a source endpoint and a destination endpoint, the network comprising:

at least one ingress port at a first data switch in the network for receiving inbound frames from a source endpoint, each frame having a header that includes first destination address information;

at least one address adaptor at the first data switch for mapping the first destination address information of each received frame to internal address information to provide internal frames;

at least another address adaptor at a second data switch in the network for changing the internal destination address information of each internal frame to the first destination address information to provide outbound frames;

and at least one egress port at the second data switch for transmitting the outbound frames to a destination point.

* * * * *